US011996034B2

(12) United States Patent

Xiao et al.

(10) Patent No.: US 11,996,034 B2

(45) Date of Patent: May 28, 2024

(54) DISPLAY PANEL WITH REDUCED CROSS TALK OF SIGNAL WIRES, CONTROL METHOD FOR SAME, AND DISPLAY DEVICE

(71) Applicant: BOE Technology Group Co., Ltd., Beijing (CN)

(72) Inventors: Li Xiao, Beijing (CN); Haoliang Zheng, Beijing (CN); Minghua Xuan, Beijing (CN); Hao Chen, Beijing (CN); Dongni Liu, Beijing (CN); Jiao Zhao, Beijing (CN); Seungwoo Han, Beijing (CN); Liang Chen, Beijing (CN); Qi Qi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 185 days.

(21) Appl. No.: 17/634,544

(22) PCT Filed: Apr. 15, 2021

(86) PCT No.: PCT/CN2021/087404

§ 371 (c)(1),
(2) Date: Feb. 10, 2022

(87) PCT Pub. No.: WO2022/217527

PCT Pub. Date: Oct. 20, 2022

(65) Prior Publication Data

US 2023/0360586 A1 Nov. 9, 2023

(51) Int. Cl.

*G09G 3/32* (2016.01)
*G09G 3/3233* (2016.01)

(52) U.S. Cl.

CPC ............ *G09G 3/32* (2013.01); *G09G 3/3233* (2013.01); *G09G 2300/0426* (2013.01);

(Continued)

(58) Field of Classification Search

CPC ............ G09G 3/32; G09G 2310/0267; G09G 2310/0275; G09G 2310/0297;

(Continued)

(56) References Cited

U.S. PATENT DOCUMENTS

2019/0066614 A1 2/2019 Tang et al.
2021/0201760 A1* 7/2021 Wang .................. G09G 3/3233

FOREIGN PATENT DOCUMENTS

CN 107331363 A 11/2017
CN 109872680 A * 6/2019 ............... G09G 3/32

* cited by examiner

*Primary Examiner* — Adam J Snyder

(74) *Attorney, Agent, or Firm* — Ling Wu; Stephen Yang; Ling and Yang Intellectual Property

(57) ABSTRACT

Disclosed are a display panel, a control method for the same, and a display device. The display panel includes: M rows and N columns of pixel units, N current data lines sequentially arranged along a row direction, and N time-length data lines sequentially arranged along the row direction. Each pixel unit includes a pixel circuit, the pixel circuit including a current data terminal and a time-length data terminal. An $i^{th}$ column of the current data lines and an $i^{th}$ column of the time-length data lines are respectively located on two sides of an $i^{th}$ column of pixel units, the current data terminals of the pixel circuits of the $i^{th}$ column of pixel units are electrically connected to the $i^{th}$ column of the current data lines.

19 Claims, 14 Drawing Sheets

(52) U.S. Cl.
CPC ............... *G09G 2300/0819* (2013.01); *G09G 2300/0861* (2013.01); *G09G 2310/0251* (2013.01); *G09G 2310/0267* (2013.01); *G09G 2310/0275* (2013.01); *G09G 2310/0297* (2013.01); *G09G 2310/08* (2013.01); *G09G 2320/0223* (2013.01); *G09G 2320/0233* (2013.01); *G09G 2320/0247* (2013.01)

(58) Field of Classification Search
CPC ... G09G 2320/0233; G09G 2320/0247; G09G 2300/0426; G09G 2300/0819; G09G 2300/0861; G09G 2310/0251; G09G 2310/08; G09G 2320/0223; G09G 3/3233
See application file for complete search history.

DISPLAY PANEL WITH REDUCED CROSS TALK OF SIGNAL WIRES, CONTROL METHOD FOR SAME, AND DISPLAY DEVICE

CROSS-REFERENCE TO RELATED APPLICATIONS

This application is a national stage application of PCT Application No. PCT/CN2021/087404, which is filed on Apr. 15, 2021, the contents of which are hereby incorporated by reference in their entirety.

TECHNICAL FIELD

Embodiments of the disclosure relate to, but are not limited to, the technical field of display, and more particularly to a display panel, a control method for the same, and a display device.

BACKGROUND

The display market is booming currently. As the consumer demand for various display products such as laptops, smart phones, TVs, tablets, smart watches and fitness wristbands continues to increase, more new display products will emerge in the future.

SUMMARY

The below is a summary about the subject matter described in the present disclosure in detail. The summary is not intended to limit the scope of protection of the claims.

According to a first aspect, the present disclosure provides a display panel, including: M rows and N columns of pixel units, N current data lines sequentially arranged in a row direction, and N time-length data lines sequentially arranged in the row direction. Each pixel unit includes a pixel circuit, the pixel circuit including a current data terminal and a time-length data terminal.

An $i^{th}$ column of the current data lines and an $i^{th}$ column of the time-length data lines are respectively located on two sides of an $i^{th}$ column of pixel units, the current data terminals of the pixel circuits of the $i^{th}$ column of pixel units are electrically connected to the $i^{th}$ column of the current data lines, and the time-length data terminals of the pixel circuits of the $i^{th}$ column of pixel units are electrically connected to the $i^{th}$ column of the time-length data lines, where $1 \le i \le N$.

The time for two current data lines between two adjacent columns of pixel units, and/or two time-length data lines between two adjacent columns of pixel units, and/or a time-length data line and a current data line between two adjacent columns of pixel units to receive a valid level signal does not coincide.

In some possible implementation modes, the display panel further includes a first current selection signal wire, a second current selection signal wire, a first time-length selection signal wire, and a second time-length selection signal wire.

Two adjacent columns of current data lines are respectively electrically connected to the first current selection signal wire and the second current selection signal wire, and two adjacent columns of time-length data lines are respectively electrically connected to the first time-length selection signal wire and the second time-length selection signal wire.

The time for the first current selection signal wire, the second current selection signal wire, the first time-length selection signal wire, and the second time-length selection signal wire to receive a valid level signal does not coincide.

In some possible implementation modes, the current data lines in even columns are electrically connected to the first current selection signal wire, the time-length data lines in even columns are electrically connected to the first time-length selection signal wire, the current data lines in odd columns are electrically connected to the second current selection signal wire, and the time-length data lines in odd columns are electrically connected to the second time-length selection signal wire.

Alternatively, the current data lines in even columns are electrically connected to the first current selection signal wire, the time-length data lines in even columns are electrically connected to the first time-length selection signal wire, the current data lines in odd columns are electrically connected to the second current selection signal wire, and the time-length data lines in odd columns are electrically connected to the second time-length selection signal wire.

In some possible implementation modes, the display panel further includes: M scanning signal wires sequentially arranged in a column direction, M reset signal wires sequentially arranged in the column direction, and M light-emitting signal wires sequentially arranged in the column direction.

The pixel circuit further induces: a scanning signal terminal, a reset signal terminal, and a light-emitting signal terminal.

For each pixel circuit in an $m^{th}$ row of pixel units, the scanning signal terminal of the pixel circuit is electrically connected to an $m^{th}$ row of scanning signal wire, the reset signal terminal of the pixel circuit is electrically connected to an $m^{th}$ row of reset signal wire, and the light-emitting signal terminal of the pixel circuit is electrically connected to an $m^{th}$ row of light-emitting signal wire, where $1 \le m \le M$.

In some possible implementation modes, each pixel unit further includes: a light-emitting element, the pixel circuit and the light-emitting element in the same pixel unit are electrically connected, and the pixel circuit includes: a current control sub-circuit and a time-length control sub-circuit.

The current control sub-circuit is electrically connected to a current data terminal, a scanning signal terminal, a reset signal terminal, an initial signal terminal, a light-emitting signal terminal, a first power terminal, a first node, and a second node, respectively, and is arranged to provide a drive current to the second node under the control of the current data terminal, the scanning signal terminal, the reset signal terminal, the initial signal terminal, the light-emitting signal terminal, the first power terminal, and the first node.

The time-length control sub-circuit is electrically connected to a scanning signal terminal, a time-length data terminal, a ground terminal, a reset signal terminal, a light-emitting signal terminal, a high-frequency input terminal and the first node, respectively, and is arranged to provide a signal of the light-emitting signal terminal or a signal of the high-frequency input terminal to the first node under the control of the scanning signal terminal, the time-length data terminal, the ground terminal, the light-emitting signal terminal, the reset signal terminal, and the high-frequency input terminal.

The light-emitting element is electrically connected to the second node and a second power terminal, respectively.

In some possible implementation modes, the current control sub-circuit includes: a node control sub-circuit, a writing sub-circuit, a drive sub-circuit, and a light-emitting control sub-circuit.

The node control sub-circuit is electrically connected to the scanning signal terminal, the reset signal terminal, the initial signal terminal, the second node, a third node, a fourth node, and the first power terminal, respectively, and is arranged to provide a signal of the initial signal terminal to the second node and the third node and provide a signal of the third node to the fourth node under the control of the reset signal terminal and the scanning signal terminal.

The writing sub-circuit is electrically connected to the scanning signal terminal, the current data terminal, and a fifth node, respectively, and is arranged to provide a signal of the current data terminal to the fifth node under the control of the scanning signal terminal.

The drive sub-circuit is electrically connected to the third node, the fourth node, and the fifth node, respectively, and is arranged to provide the drive current to the fourth node, under the control of the third node and the fifth node.

The light-emitting control sub-circuit is electrically connected to the light-emitting signal terminal, the first node, the second node, the fourth node, the fifth node, and the first power terminal, respectively, and is arranged to provide a signal of the first power terminal to the fifth node and provide a signal of the fourth node to the second node under the control of the first node and the light-emitting signal terminal.

In some possible implementation modes, the node control sub-circuit includes: a first transistor, a second transistor, a third transistor, and a first capacitor, the writing sub-circuit includes: a fourth transistor, the drive sub-circuit includes: a fifth transistor, and the light-emitting control sub-circuit includes: a sixth transistor, a seventh transistor and an eighth transistor.

A control electrode of the first transistor is electrically connected to the reset signal terminal, a first electrode of the first transistor is electrically connected to the initial signal terminal, and a second electrode of the first transistor is electrically connected to the third node.

A control electrode of the second transistor is electrically connected to the reset signal terminal, a first electrode of the second transistor is electrically connected to the initial signal terminal, and a second electrode of the second transistor is electrically connected to the second node.

A control electrode of the third transistor is electrically connected to the scanning signal terminal, a first electrode of the third transistor is electrically connected to the third node, and a second electrode of the third transistor is electrically connected to the fourth node.

A first terminal of the first capacitor is electrically connected to the third node, and a second terminal of the first capacitor is electrically connected to the first power terminal.

A control electrode of the fourth transistor is electrically connected to the scanning signal terminal, a first electrode of the fourth transistor is electrically connected to the fifth node, and a second electrode of the fourth transistor is electrically connected to the current data terminal.

A control terminal of the fifth transistor is electrically connected to the third node, a first electrode of the fifth transistor is electrically connected to the fifth node, and a second electrode of the fifth transistor is electrically connected to the fourth node.

A control terminal of the sixth transistor is electrically connected to the light-emitting signal terminal, a first electrode of the sixth transistor is electrically connected to the first power terminal, and a second electrode of the sixth transistor is electrically connected to the fifth node.

A control electrode of the seventh transistor is electrically connected to the light-emitting signal terminal, a first electrode of the seventh transistor is electrically connected to the fourth node, and a second electrode of the seventh transistor is electrically connected to a first electrode of the eighth transistor.

A control electrode of the eighth transistor is electrically connected to the first node, and a second electrode of the eighth transistor is electrically connected to the second node.

The first transistor, the second transistor, the third transistor, the fourth transistor, the sixth transistor, the seventh transistor, and the eighth transistor are switch transistors, and the fifth transistor is a drive transistor.

In some possible implementation modes, the node control sub-circuit includes: a first transistor, a second transistor, a third transistor, and a first capacitor, the writing sub-circuit includes: a fourth transistor, the drive sub-circuit includes: a fifth transistor, and the light-emitting control sub-circuit includes: a sixth transistor and an eighth transistor.

A control electrode of the first transistor is electrically connected to the reset signal terminal, a first electrode of the first transistor is electrically connected to the initial signal terminal, and a second electrode of the first transistor is electrically connected to the third node.

A control electrode of the second transistor is electrically connected to the reset signal terminal, a first electrode of the second transistor is electrically connected to the initial signal terminal, and a second electrode of the second transistor is electrically connected to the second node.

A control electrode of the third transistor is electrically connected to the scanning signal terminal, a first electrode of the third transistor is electrically connected to the third node, and a second electrode of the third transistor is electrically connected to the fourth node.

A first terminal of the first capacitor is electrically connected to the third node, and a second terminal of the first capacitor is electrically connected to the first power terminal.

A control electrode of the fourth transistor is electrically connected to the scanning signal terminal, a first electrode of the fourth transistor is electrically connected to the fifth node, and a second electrode of the fourth transistor is electrically connected to the current data terminal.

A control terminal of the fifth transistor is electrically connected to the third node, a first electrode of the fifth transistor is electrically connected to the fifth node, and a second electrode of the fifth transistor is electrically connected to the fourth node.

A control terminal of the sixth transistor is electrically connected to the light-emitting signal terminal, a first electrode of the sixth transistor is electrically connected to the first power terminal, and a second electrode of the sixth transistor is electrically connected to the fifth node.

A control electrode of the eighth transistor is electrically connected to the first node, a first electrode of the eighth transistor is electrically connected to the fourth node, and a second electrode of the eighth transistor is electrically connected to the second node.

The first transistor, the second transistor, the third transistor, the fourth transistor, the sixth transistor, and the eighth transistor are switch transistors, and the fifth transistor is a drive transistor.

In some possible implementation modes, the time-length control sub-circuit includes: a first control sub-circuit and a second control sub-circuit.

The first control sub-circuit is electrically connected to the time-length data terminal, the scanning signal terminal, the ground terminal, the light-emitting signal terminal, and the first node, respectively, and is arranged to provide the signal of the light-emitting signal terminal to the first node under the control of the current data terminal, the scanning signal terminal, and the ground terminal.

The second control sub-circuit is electrically connected to the time-length data terminal, the reset signal terminal, the ground terminal, the high-frequency input terminal, and the first node, respectively, and is arranged to provide the signal of the high-frequency input terminal to the first node under the control of the time-length data terminal, the reset signal terminal, and the ground terminal.

In some possible implementation modes, the first control sub-circuit includes: a ninth transistor, a tenth transistor, and a second capacitor; and the second control sub-circuit includes: an eleventh transistor, a twelfth transistor, and a third capacitor.

A control electrode of the ninth transistor is electrically connected to a sixth node, a first electrode of the ninth transistor is electrically connected to the light-emitting signal terminal, and a second electrode of the ninth transistor is electrically connected to the first node.

A control electrode of the tenth transistor is electrically connected to the scanning signal terminal, a first electrode of the tenth transistor is electrically connected to the time-length data terminal, and a second electrode of the tenth transistor is electrically connected to the sixth node.

A first terminal of the second capacitor is electrically connected to the sixth node, and a second terminal of the second capacitor is electrically connected to the ground terminal.

A control electrode of the eleventh transistor is electrically connected to a seventh node, a first electrode of the eleventh transistor is electrically connected to the high-frequency input terminal, and a second electrode of the eleventh transistor is electrically connected to the first node.

A control electrode of the twelfth transistor is electrically connected to the reset signal terminal, a first electrode of the twelfth transistor is electrically connected to the time-length data terminal, and a second electrode of the twelfth transistor is electrically connected to the seventh node.

A first terminal of the third capacitor is electrically connected to the seventh node, and a second terminal of the third capacitor is electrically connected to the ground terminal.

The ninth transistor, the tenth transistor, the eleventh transistor, and the twelfth transistor are switch transistors.

In some possible implementation modes, the light-emitting element is a micro-light-emitting diode, an anode of the light-emitting element is electrically connected to the second node, and a cathode of the light-emitting element is electrically connected to the second power terminal.

In some possible implementation modes, the current control sub-circuit includes: a first transistor, a second transistor, a third transistor, a first capacitor, a fourth transistor, a fifth transistor, a sixth transistor, a seventh transistor and an eighth transistor; and the time-length control sub-circuit includes: a ninth transistor, a tenth transistor, a second capacitor, an eleventh transistor, a twelfth transistor, and a third capacitor.

A control electrode of the first transistor is electrically connected to the reset signal terminal, a first electrode of the first transistor is electrically connected to the initial signal terminal, and a second electrode of the first transistor is electrically connected to the third node.

A control electrode of the second transistor is electrically connected to the reset signal terminal, a first electrode of the second transistor is electrically connected to the initial signal terminal, and a second electrode of the second transistor is electrically connected to the second node.

A control electrode of the third transistor is electrically connected to the scanning signal terminal, a first electrode of the third transistor is electrically connected to the third node, and a second electrode of the third transistor is electrically connected to the fourth node.

A first terminal of the first capacitor is electrically connected to the third node, and a second terminal of the first capacitor is electrically connected to the first power terminal.

A control electrode of the fourth transistor is electrically connected to the scanning signal terminal, a first electrode of the fourth transistor is electrically connected to the fifth node, and a second electrode of the fourth transistor is electrically connected to the current data terminal.

A control terminal of the fifth transistor is electrically connected to the third node, a first electrode of the fifth transistor is electrically connected to the fifth node, and a second electrode of the fifth transistor is electrically connected to the fourth node.

A control terminal of the sixth transistor is electrically connected to the light-emitting signal terminal, a first electrode of the sixth transistor is electrically connected to the first power terminal, and a second electrode of the sixth transistor is electrically connected to the fifth node.

A control electrode of the seventh transistor is electrically connected to the light-emitting signal terminal, a first electrode of the seventh transistor is electrically connected to the fourth node, and a second electrode of the seventh transistor is electrically connected to a first electrode of the eighth transistor.

A control electrode of the eighth transistor is electrically connected to the first node, and a second electrode of the eighth transistor is electrically connected to the second node.

A control electrode of the ninth transistor is electrically connected to a sixth node, a first electrode of the ninth transistor is electrically connected to the light-emitting signal terminal, and a second electrode of the ninth transistor is electrically connected to the first node.

A control electrode of the tenth transistor is electrically connected to the scanning signal terminal, a first electrode of the tenth transistor is electrically connected to the time-length data terminal, and a second electrode of the tenth transistor is electrically connected to the sixth node.

A first terminal of the second capacitor is electrically connected to the sixth node, and a second terminal of the second capacitor is electrically connected to the ground terminal.

A control electrode of the eleventh transistor is electrically connected to a seventh node, a first electrode of the eleventh transistor is electrically connected to the high-frequency input terminal, and a second electrode of the eleventh transistor is electrically connected to the first node.

A control electrode of the twelfth transistor is electrically connected to the reset signal terminal, a first electrode of the twelfth transistor is electrically connected to the time-length data terminal, and a second electrode of the twelfth transistor is electrically connected to the seventh node.

A first terminal of the third capacitor is electrically connected to the seventh node, and a second terminal of the third capacitor is electrically connected to the ground terminal.

In some possible implementation modes, the current control sub-circuit includes: a first transistor, a second transistor, a third transistor, a first capacitor, a fourth transistor, a fifth transistor, a sixth transistor, and an eighth transistor; and the time-length control sub-circuit includes: a ninth transistor, a tenth transistor, a second capacitor, an eleventh transistor, a twelfth transistor, and a third capacitor.

A control electrode of the first transistor is electrically connected to the reset signal terminal, a first electrode of the first transistor is electrically connected to the initial signal terminal, and a second electrode of the first transistor is electrically connected to the third node.

A control electrode of the second transistor is electrically connected to the reset signal terminal, a first electrode of the second transistor is electrically connected to the initial signal terminal, and a second electrode of the second transistor is electrically connected to the second node.

A control electrode of the third transistor is electrically connected to the scanning signal terminal, a first electrode of the third transistor is electrically connected to the third node, and a second electrode of the third transistor is electrically connected to the fourth node.

A first terminal of the first capacitor is electrically connected to the third node, and a second terminal of the first capacitor is electrically connected to the first power terminal.

A control electrode of the fourth transistor is electrically connected to the scanning signal terminal, a first electrode of the fourth transistor is electrically connected to the fifth node, and a second electrode of the fourth transistor is electrically connected to the current data terminal.

A control terminal of the fifth transistor is electrically connected to the third node, a first electrode of the fifth transistor is electrically connected to the fifth node, and a second electrode of the fifth transistor is electrically connected to the fourth node.

A control terminal of the sixth transistor is electrically connected to the light-emitting signal terminal, a first electrode of the sixth transistor is electrically connected to the first power terminal, and a second electrode of the sixth transistor is electrically connected to the fifth node.

A control electrode of the eighth transistor is electrically connected to the first node, a first electrode of the eighth transistor is electrically connected to the fourth node, and a second electrode of the eighth transistor is electrically connected to the second node.

A control electrode of the ninth transistor is electrically connected to a sixth node, a first electrode of the ninth transistor is electrically connected to the light-emitting signal terminal, and a second electrode of the ninth transistor is electrically connected to the first node.

A control electrode of the tenth transistor is electrically connected to the scanning signal terminal, a first electrode of the tenth transistor is electrically connected to the time-length data terminal, and a second electrode of the tenth transistor is electrically connected to the sixth node.

A first terminal of the second capacitor is electrically connected to the sixth node, and a second terminal of the second capacitor is electrically connected to the ground terminal.

A control electrode of the eleventh transistor is electrically connected to a seventh node, a first electrode of the eleventh transistor is electrically connected to the high-frequency input terminal, and a second electrode of the eleventh transistor is electrically connected to the first node.

A control electrode of the twelfth transistor is electrically connected to the reset signal terminal, a first electrode of the twelfth transistor is electrically connected to the time-length data terminal, and a second electrode of the twelfth transistor is electrically connected to the seventh node.

A first terminal of the third capacitor is electrically connected to the seventh node, and a second terminal of the third capacitor is electrically connected to the ground terminal.

In some possible implementation modes, in a case where a gray tone displayed by the pixel unit is less than a threshold gray tone, when a level of a signal of the reset signal terminal is a valid level signal, a level of a signal of the time-length data terminal is a first invalid level, and when a level of a signal of the scanning signal terminal is a valid level signal, the level of the signal of the time-length data terminal is a first valid level.

In a case where a gray tone displayed by the pixel unit is less than a threshold gray tone, when a level of a signal of the reset signal terminal is a valid level signal, a level of a signal of the time-length data terminal is a second valid level, and when a level of a signal of the scanning signal terminal is a valid level signal, the level of the signal of the time-length data terminal is a second invalid level.

The first invalid level is a level making the twelfth transistor off, the first valid level is a level making the ninth transistor on, the second valid level is a level making the twelfth transistor on, and the second invalid level is a level making the ninth transistor off.

In some possible implementation modes, the display panel further includes a multiplexed output selection circuit, K current data output lines sequentially arranged in a column direction, and K time-length data output lines sequentially arranged in the column direction, where K=N/2.

The multiplexed output selection circuit is electrically connected to N current data lines, N time-length data lines, K current data output lines, K time-length data output lines, a first current selection signal wire, a second current selection signal wire, a first time-length selection signal wire, and a second time-length selection signal wire, respectively, and is arranged to output data signals of the K current data lines to the N current data lines in a time-sharing manner and output data signals of the K time-length data output lines to the N time-length data lines in a time-sharing manner under the control of the first current selection signal wire, the second current selection signal wire, the first time-length selection signal wire, and the second time-length selection signal wire.

In some possible implementation modes, the multiplexed output selection circuit includes: K first current selection transistors, K second current selection transistors, K first time-length selection transistors, and K second time-length selection transistors.

A control electrode of a $k^{th}$ first current selection transistor is electrically connected to the first current selection signal wire, a first electrode of the $k^{th}$ first current selection transistor is electrically connected to a $(2k-1)^{th}$ column of the current data lines, and a second electrode of the $k^{th}$ first current selection transistor is electrically connected to a $k^{th}$ column of current data output line, where $1 \le k \le K$.

A control electrode of a $k^{th}$ second current selection transistor is electrically connected to the second current selection signal wire, a first electrode of the $k^{th}$ second current selection transistor is electrically connected to a $(2k)^{th}$ column of the current data lines, and a second electrode of the $k^{th}$ second current selection transistor is electrically connected to the $k^{th}$ column of current data output line.

A control electrode of a $k^{th}$ first time-length selection transistor is electrically connected to the first time-length selection signal wire, a first electrode of the $k^{th}$ first time-length selection transistor is electrically connected to a $(2k-1)^{th}$ column of the time-length data lines, and a second electrode of the $k^{th}$ first time-length selection transistor is electrically connected to a $k^{th}$ column of time-length data output line.

A control electrode of a $k^{th}$ second time-length selection transistor is electrically connected to the second time-length selection signal wire, a first electrode of the $k^{th}$ second time-length selection transistor is electrically connected to a $(2k)^{th}$ column of the time-length data lines, and a second electrode of the $k^{th}$ second time-length selection transistor is electrically connected to the $k^{th}$ column of time-length data output line.

The first current selection transistor, the second current selection transistor, the first time-length selection transistor, and the second time-length selection transistor are switch transistors.

In some possible implementation modes, a duration of the valid level signal of the first current selection signal wire is equal to a duration of the valid level signal of the second current selection signal wire, a duration of the valid level signal of the first time-length selection signal wire is equal to a duration of the valid level signal of the second time-length selection signal wire, and the duration of the valid level signal of the first current selection signal wire is greater than the duration of the valid level signal of the first time-length selection signal wire.

According to a second aspect, the present disclosure also provides a display device, including the abovementioned display panel.

According to a third aspect, the present disclosure also provides a control method for a display panel. The control method is used for controlling the abovementioned display panel. The method includes the following operations.

A signal is provided to N current data lines and along N time-length data lines so that the time for two current data lines between two adjacent columns of pixel units, and/or two time-length data lines between two adjacent columns of pixel units, and/or a time-length data line and a current data line between two adjacent columns of pixel units to receive a valid level signal does not coincide.

In some possible implementation modes, the display panel includes: M rows and N columns of pixel units, M scanning signal wires sequentially arranged in a column direction, M reset signal wires sequentially arranged in the column direction, and M light-emitting signal wires sequentially arranged in the column direction; each pixel unit includes a pixel circuit. Scanning signal terminals of the same row of pixel circuits are connected to the same scanning signal wire, light-emitting signal terminals of the same row of pixel circuits are connected to the same light-emitting signal wire, and reset signal terminals of the same row of pixel circuits are connected to the same reset signal wire. The pixel circuit includes: a node control sub-circuit, a writing sub-circuit, a drive sub-circuit, a light-emitting control sub-circuit, a first control sub-circuit, and a second control sub-circuit.

Under the control of the reset signal wire, a signal is provided to the reset signal terminal of each pixel circuit in the same row of pixel circuits, so that the node control sub-circuit of each pixel circuit in the same row of pixel circuits provides a signal of the initial signal terminal to a second node and a third node under the control of the reset signal terminal.

Under the control of the scanning signal wire, a signal is provided to the scanning signal terminal of each pixel circuit in the same row of pixel circuits, so that the writing sub-circuit of each pixel circuit in the same row of pixel circuits provides a signal of the current data terminal to a fifth node under the control of the scanning signal terminal, and the drive sub-circuit provides a drive current to a fourth node under the control of the third node and the fifth node.

Under the control of the light-emitting signal wire, a signal is provided to the light-emitting signal terminal of each pixel circuit in the same row of pixel circuits, so that the light-emitting control sub-circuit of each pixel circuit in the same row of pixel circuits provides a signal of the first power terminal to the fifth node and provide a signal of the fourth node to the second node under the control of the first node and the light-emitting signal terminal.

In a case where a gray tone displayed by the pixel unit is greater than a threshold gray tone, the method further includes: under the control of the scanning signal wire, a signal is provided to the scanning signal terminal of each pixel circuit in the same row of pixel circuits, so that the first control sub-circuit of each pixel circuit in the same row of pixel circuits provides a signal of the light-emitting signal terminal to the first node under the control of the current data terminal, the scanning signal terminal, and the ground terminal.

In case of where a gray tone displayed by the pixel unit is less than a threshold gray tone, the method further includes: under the control of the reset signal wire, a signal is provided to the reset signal terminal of each pixel circuit in the same row of pixel circuits, so that the second control sub-circuit of each pixel circuit in the same row of pixel circuits provide a signal of the high-frequency input terminal to the first node under the control of the time-length data terminal, the reset signal terminal, and the ground terminal.

After the drawings and the detailed descriptions are read and understood, the other aspects may be comprehended.

BRIEF DESCRIPTION OF DRAWINGS

The accompany drawings are used to provide further understanding of the technical solution of the disclosure, and form a part of the description. The accompany drawings and embodiments of the disclosure are adopted to explain the technical solution of the disclosure, and do not form limits to the technical solution of the disclosure.

DETAILED DESCRIPTION

Figure 1:
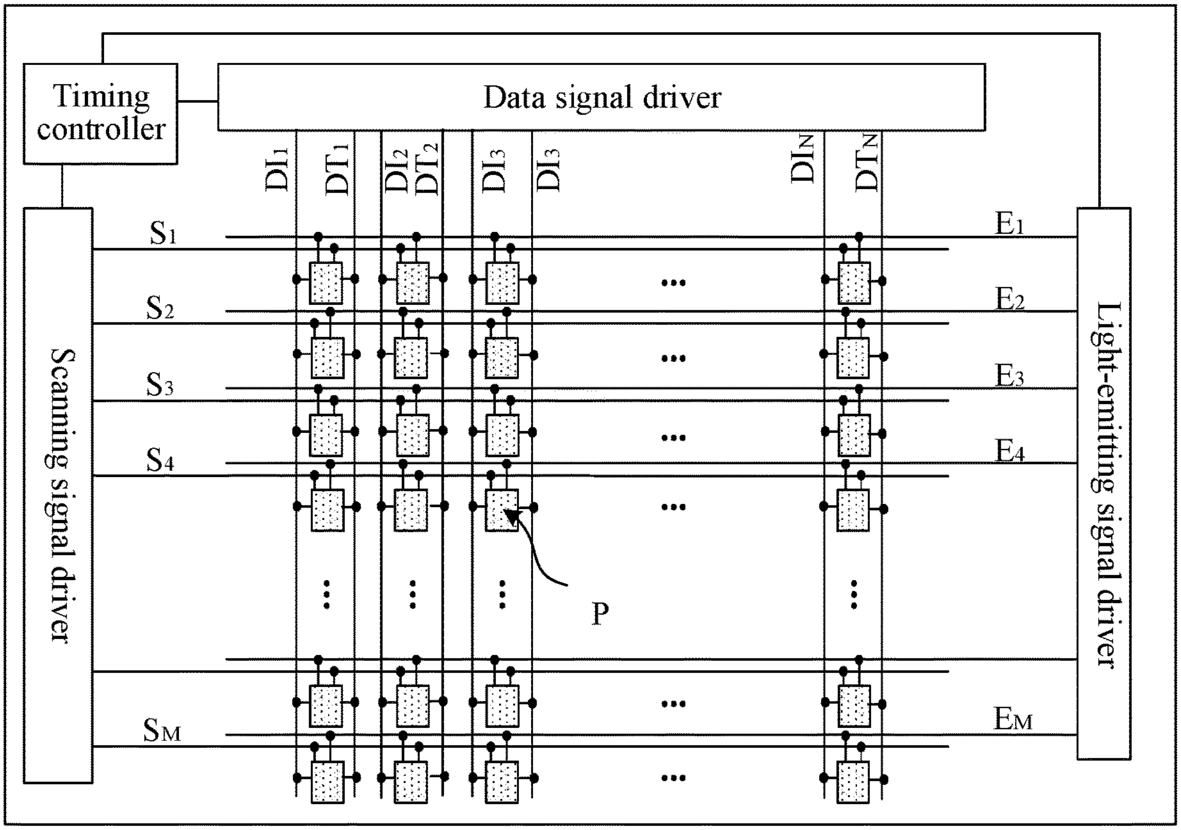
FIG. 1 is a schematic structural diagram of a display panel.

To make the objectives, technical solutions, and advantages of the present disclosure clearer, the embodiments of the present disclosure will be described in detail below in combination with the accompany drawings. It is to be noted that the implementation modes may be implemented in various forms. Those of ordinary skill in the art can easily understand such a fact that modes and contents may be transformed into various forms without departing from the purpose and scope of the present disclosure. Therefore, the present disclosure should not be explained as being limited to the contents recorded in the following implementation modes only. The embodiments and features in the embodiments of the present disclosure may be randomly combined with each other in case of no conflicts.

In the accompanying drawings, the size of each composition element, the thicknesses of layers, or regions may be exaggerated sometimes for clarity. Therefore, a mode of the present disclosure is not always limited to the size, and the shape and size of each component in the drawings do not reflect the true scale. In addition, the accompanying drawings schematically illustrate ideal examples, and a mode of the present disclosure is not limited to the shapes, numerical values, or the like shown in the drawings.

Ordinal numerals "first", "second", "third", etc., in the specification are set not to form limits in number but only to avoid the confusion of composition elements.

In the specification, for convenience, expressions "central", "above", "below", "front", "back", "vertical", "horizontal", "top", "bottom", "inside", "outside", etc., indicating directional or positional relationships are used to illustrate positional relationships between the composition elements, not to indicate or imply that involved devices or elements are required to have specific orientations and be structured and operated with the specific orientations but only to easily and simply describe the present specification, and thus should not be understood as limits to the present disclosure. The positional relationships between the composition elements may be changed as appropriate according to the direction where each composition element is described. Therefore, appropriate replacements based on situations are allowed, not limited to the expressions in the specification.

In the specification, unless otherwise specified and defined, terms "mounting", "mutual connection", and "connection" should be generally understood. For example, the term may be fixed connection, or detachable connection, or integral connection. The term may be mechanical connection or electric connection. The term may be direct connection, or indirect connection through an intermediate, or communication inside two elements. Those of ordinary skill in the art can understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source region. It is to be noted that in the specification, the channel region refers to a main region that a current flows through.

In the specification, a first electrode may be the drain electrode, and a second electrode may be the source electrode. Alternatively, the first electrode may be a source electrode, and the second electrode may be a drain electrode. In cases that transistors with opposite polarities are used, or a current direction changes during work of a circuit, or the like, functions of the "source electrode" and the "drain electrode" may sometimes be exchanged. Therefore, the "source electrode" and the "drain electrode" may be exchanged in the specification.

In the specification, "electric connection" includes connection of the composition elements through an element with a certain electric action. "An element with a certain electric action" is not particularly limited as long as electric signals between the connected composition elements may be sent and received. Examples of "an element with a certain electric action" not only include an electrode and a line, but also include a switch element such as a transistor, a resistor, an inductor, a capacitor, another element with various functions, etc.

For a high-resolution display product, among multiple pixels arranged in an array, pixels in the same column share one signal wire, thereby saving a wiring space and reducing the difficulty in process implementation.

In the case that the pixel of the high-resolution display product includes a micro-inorganic light-emitting diode, the micro-inorganic light-emitting diode is a current-type drive element; under the driving of a lower current density, chromaticity coordinate drift and low external quantum efficiency will occur, resulting in poor uniformity of brightness. Thus, it is difficult to accurately represent a low gray tone only by controlling a current amplitude. Therefore, it is required to control a time length of a current provided to the micro-inorganic light-emitting diode on the basis of controlling the amplitude of the current provided to the micro-inorganic light-emitting diode so as to achieve accurate gray tone display. It can be understood that, in some embodiments, a pixel circuit used to provide a drive signal (a current signal) to the micro-inorganic light-emitting diode includes at least two types of data terminals, namely a current data terminal and a time-length data terminal. The current data terminal is arranged to provide the current signal of different amplitudes to the micro-inorganic light-emitting diode, and the time-length data terminal is arranged to control the time length for providing the above-mentioned current signal to the micro-inorganic light-emitting diode. The inventor found that when the pixel circuits each including the two types of data terminals are arranged in an array, the current data terminals in the same column of pixel circuits share a current data line, and the time-length data terminals in the same column of pixel circuits share a time-length data line; and comparing this display panel with a display product that only requires one type of data line, the wiring space of each data line is further reduced, resulting in a smaller distance between adjacent data lines, further causing signal crosstalk, leading to poor column brightness contrast, and reducing display effect of the display product.

FIG. 1 is a schematic structural diagram of a display panel. As shown in FIG. 1, the display panel may include a timing controller, a data signal driver, a scanning signal driver, a light-emitting signal driver, and M*N pixel units P. An array of the multiple pixel units P is connected to multiple scanning signal wires ($S_1$ to $S_M$), multiple current data lines ($DI_1$ to $DI_N$), multiple time-length data lines ($DT_1$ to $DT_N$), and multiple light-emitting signal wires ($E_1$ to $E_M$), respectively.

In an exemplary embodiment, the timing controller may provide a gray-scale value and control signal suitable for a specification of the data signal driver to the data signal driver, may provide a clock signal, a scan starting signal, etc., suitable for a specification of the scanning signal driver to the scanning signal driver, and may also provide a clock signal, an emission stopping signal, etc., suitable for a specification of the light-emitting signal driver to the light-emitting signal driver. It can be understood that, the embodiment of the present disclosure is described by taking that the entire display panel is driven in a progressive scanning manner as an example.

In an exemplary embodiment, the data signal driver may use a gray value and control signal received from the timing controller to generate a data voltage that is to be provided to the current data lines $DI_1, DI_2, \ldots, DI_N$ and a data voltage that is to be provided to the multiple time-length data lines $DT_1, DT_2, \ldots, DT_N$, where N may be a natural number.

In an exemplary embodiment, the scanning signal driver may receive a clock signal, a scan starting signal, etc., from the timing controller to generate a scanning signal that is to be provided to the scanning lines $S_1, S_2, S_3, \ldots$, and $S_M$. For example, the scanning signal driver may sequentially provide the scanning signal to the scanning signal wires $S_1$ to $S_M$. For example, the scanning signal driver may be composed of multiple cascaded shift registers, and may drive each shift register to sequentially generate the scanning signal under the control of the clock signal, where M may be a natural number.

In an exemplary embodiment, the light-emitting signal driver may receive the clock signal, an emission stopping signal, etc., from the timing controller to generate a light-emitting signal that is to be provided to the light-emitting signal wires $E_1, E_2, E_3, \ldots$, and $E_M$. For example, the light-emitting signal driver may sequentially provide the light-emitting signal to the light-emitting signal wires $E_1$ to $E_M$. For example, the light-emitting signal driver may be composed of multiple cascaded shift registers, and may drive each shift register to sequentially generate the light-emitting signal under the control of the clock signal, where M may be a natural number.

In an exemplary embodiment, multiple pixel units P are arranged in an array. Each pixel unit may be connected to the corresponding current data signal wire, the corresponding time-length data line, the corresponding scanning signal wire, and the corresponding light-emitting signal wire.

Figure 2:
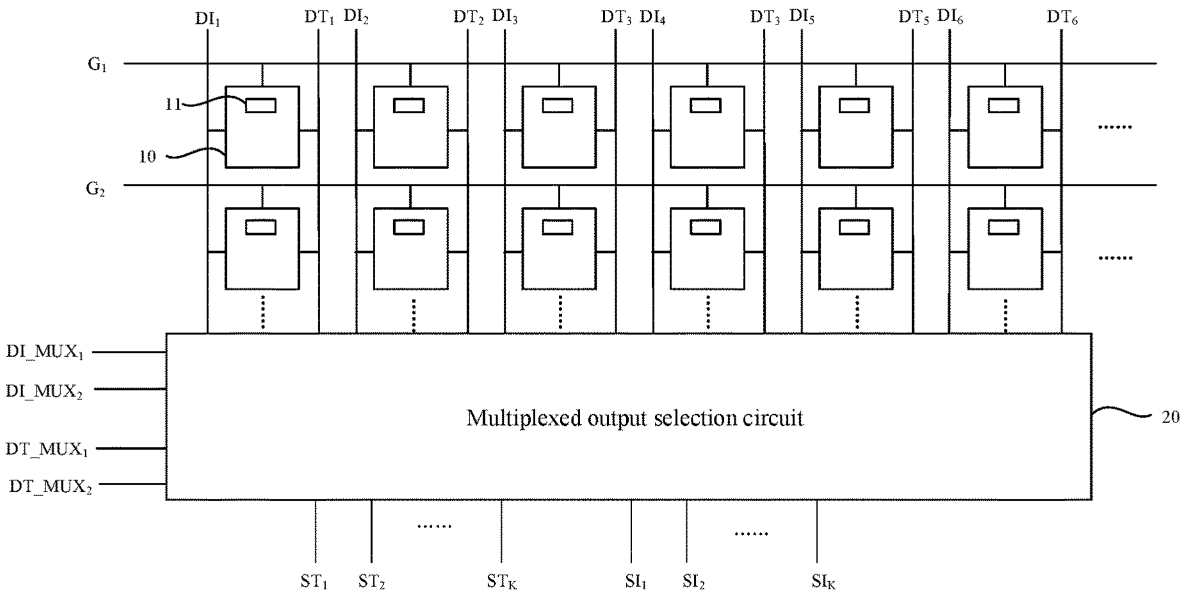
FIG. 2 is a schematic structural diagram of a display panel according to an embodiment of the present disclosure.
Figure 3:
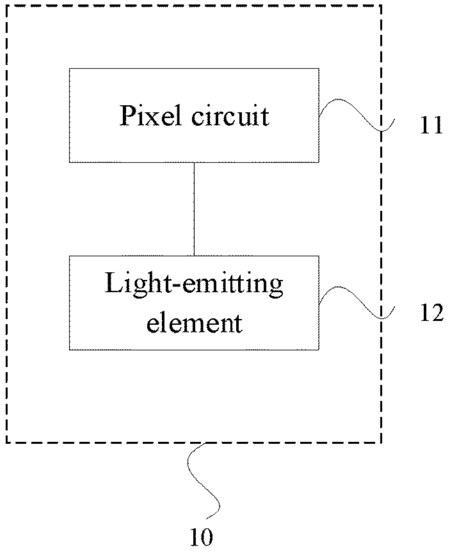
FIG. 3 is a schematic structural diagram of a pixel unit according to an exemplary embodiment.

FIG. 2 is a schematic structural diagram of a display panel according to an exemplary embodiment, and FIG. 3 is a schematic structural diagram of a pixel unit according to an exemplary embodiment. As shown in FIG. 2, the display panel according to the embodiment the present disclosure includes: M rows and N columns of pixel units 10, N current data lines $DI_1$ to $DI_N$ sequentially arranged along a row direction, and N time-length data lines $DT_1$ to $DT_N$ sequentially arranged along the row direction. Each pixel unit 10 includes a pixel circuit 11, the pixel circuit including a current data terminal and a time-length data terminal.

An $i^{th}$ column of the current data lines $DI_i$ and an $i^{th}$ column of the time-length data lines $DT_i$ are respectively located on two sides of an $i^{th}$ column of pixel units, the current data terminals of the pixel circuits of the $i^{th}$ column of pixel units are electrically connected to the $i^{th}$ column of the current data lines $DI_i$, and the time-length data terminals of the pixel circuits of the $i^{th}$ column of pixel units are electrically connected to the $i^{th}$ column of the time-length data lines $DT_i$, where $1 \leq i \leq N$. The time for two current data lines between two adjacent columns of pixel units, and/or two time-length data lines between two adjacent columns of pixel units, and/or a time-length data line and a current data line between two adjacent columns of pixel units to receive a valid level signal does not coincide.

It can be understood that the display panel may further include a substrate, and the pixel unit is arranged on the substrate.

In an exemplary embodiment, the substrate may be a rigid substrate or a flexible substrate. The rigid substrate may be, but not limited to, one or more of glass and metal foil. The flexible substrate may be, but not limited to, one or more of polyethylene terephthalate, ethylene terephthalate, polyether ether ketone, polystyrene, polycarbonate, polyarylate, polyarylate, polyimide, polyvinyl chloride, polyethylene, and textile fibers.

In an exemplary embodiment, the pixel unit may be any one of a red (R) pixel unit, a green (G) pixel unit, a blue (B) pixel unit, and a white pixel unit, which is not limited in the present disclosure. When the display panel includes the red (R) pixel unit, the green (G) pixel unit and the blue (B) pixel unit, the three pixel units can be arranged in parallel in a horizontal direction, in parallel in a vertical direction, or in a Delta shape. When the display panel includes the red (R) pixel unit, the green (G) pixel unit, the blue (B) pixel unit, and the white pixel unit, the four pixel units can be arranged in parallel in a horizontal direction, in parallel in a vertical direction, or in an array. No limits are made thereto in the present disclosure.

In an exemplary embodiment, as shown in FIG. 3, the pixel unit may further include: a light-emitting element. A pixel circuit, in the same pixel unit, is electrically connected to the light-emitting element, and is arranged to provide a drive signal to the light-emitting element so as to drive the light-emitting element to work.

When the light-emitting element emits light, since a brightness of the light-emitting element when it emits light is related to its light-emitting time length and drive current, the brightness of the light-emitting element can be controlled by adjusting its light-emitting time length and drive current. Exemplarily, if two light-emitting elements have the same drive current and different light-emitting time lengths, the two light-emitting elements have different display brightness; if two light-emitting elements have different drive currents and the same light-emitting time lengths, the two light-emitting elements also have different display brightness; and if two light-emitting elements have different drive currents and different light-emitting time lengths, whether the two light-emitting elements have the same display brightness needs to be analyzed.

In an exemplary embodiment, the light-emitting element includes a current-driven device which may use a current-type light-emitting diode, for example, a Micro Light Emitting Diode (Micro LED for short), or a Mini Light Emitting Diode (Mini LED for short), or an Organic Light Emitting Diode (OLED for short), or a Quantum Light Emitting Diode (QLED for short).

In an exemplary embodiment, the light-emitting element in the red pixel unit is a red light-emitting diode, the light-emitting element in the blue pixel unit is a blue light-emitting diode, and the light-emitting element in the green pixel unit is a green light-emitting diode, or the light-emitting elements in the red pixel unit, the blue pixel unit, the green pixel unit and the white pixel unit are all blue light-emitting diodes. With color reversal materials (such as quantum dots, and phosphors), light emission of corresponding colors such as red, blue, green and white is implemented.

In an exemplary embodiment, that an $i^{th}$ column of the current data lines $DI_i$ and an $i^{th}$ column of the time-length data lines $DT_i$ are respectively located on two sides of an $i^{th}$ column of pixel units may include: the $i^{th}$ column of the time-length data lines $DT^i$ and an $(i+1)^{th}$ column of the current data lines $DI_{i+1}$, or the $i^{th}$ column of the current data lines DI; and an $(i+1)^{th}$ column of data current line $DI_{i+1}$, or the $i^{th}$ column of the time-length data lines $DT_i$ and an $(i+1)^{th}$ column of the time-length data lines $DT_{i+1}$, or the $i^{th}$ column of the current data lines $DI_i$ and an $(i+1)^{th}$ column of the time-length data lines $DT_{i+1}$ are arranged between the $i^{th}$ column of pixel units and an $(i+1)^{th}$ column of pixel units. FIG. 2 is illustrated by taking that the $i^{th}$ column of the time-length data lines $DT^i$ and an $(i+1)^{th}$ column of the current data lines $DI_{i+1}$ are arranged between the $i^{th}$ column of pixel units and an $(i+1)^{th}$ column of pixel units as an example.

The display panel according to the embodiment of the present disclosure includes: M rows and N columns of pixel units, N current data lines sequentially arranged along a row direction, and N time-length data lines sequentially arranged along the row direction. Each pixel unit includes a pixel circuit, the pixel circuit including a current data terminal and a time-length data terminal. An $i^{th}$ column of the current data lines and an $i^{th}$ column of the time-length data lines are respectively located on two sides of an $i^{th}$ column of pixel units, the current data terminals of the pixel circuits of the $i^{th}$ column of pixel units are electrically connected to the $i^{th}$ column of the current data lines, and the time-length data terminals of the pixel circuits of the $i^{th}$ column of pixel units are electrically connected to the $i^{th}$ column of the time-length data lines. The time for two current data lines between two adjacent columns of pixel units, and/or two time-length data lines between two adjacent columns of pixel units, and/or a time-length data line and a current data line between two adjacent columns of pixel units to receive a valid level signal does not coincide. In the present disclosure, since the time for two current data lines between two adjacent columns of pixel units, and/or two time-length data lines between two adjacent columns of pixel units, and/or a time-length data line and a current data line between two adjacent columns of pixel units to receive a valid level signal do not coincide, cross talk of signal wires between adjacent pixel units may be reduced, the poor column brightness contrast is avoided, and the display effect of the display product is improved.

Figure 4:
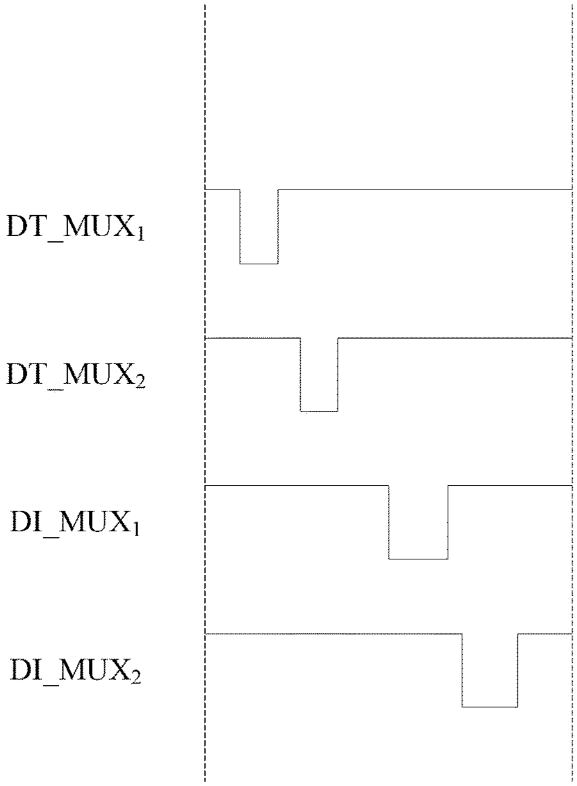
FIG. 4 is a sequence diagram of multiple selection signal wires according to an exemplary embodiment.

FIG. 4 is a sequence diagram of multiple selection signal wires according to an exemplary embodiment. As shown in FIG. 2 and FIG. 4, in an exemplary embodiment, the display panel may further include: a first current selection signal wire $DI\_MUX_1$, a second current selection signal wire $DI\_MUX_2$, a first time-length selection signal wire $DT\_MUX_1$, and a second time-length selection signal wire $DT\_MUX_2$. Two adjacent columns of current data lines are respectively electrically connected to the first current selection signal wire $DI\_MUX_1$ and the second current selection signal wire $DI\_MUX_2$, and two adjacent columns of time-length data lines are respectively electrically connected to the first time-length selection signal wire $DT\_MUX_1$ and the second time-length selection signal wire $DT\_MUX_2$. The time for the first current selection signal wire $DI\_MUX_1$, the second current selection signal wire $DI\_MUX_2$, the first time-length selection signal wire $DT\_MUX_1$, and the second time-length selection signal wire $DT\_MUX_2$ to receive a valid level signal do not coincide.

In an exemplary embodiment, the current data lines in odd columns are electrically connected to the first current selection signal wire, the time-length data lines in odd columns are electrically connected to the first time-length selection signal wire, the current data lines in even columns are electrically connected to the second current selection signal wire, and the time-length data lines in even columns are electrically connected to the second time-length selection signal wire. FIG. 2 is illustrated by an example in which the current data lines in odd columns are electrically connected to the first current selection signal wire, the time-length data lines in odd columns are electrically connected to the first time-length selection signal wire, the current data lines in even columns are electrically connected to the second current selection signal wire, and the time-length data lines in even columns are electrically connected to the second time-length selection signal wire.

In an exemplary embodiment, the current data lines in even columns are electrically connected to the first current selection signal wire, the time-length data lines in even columns are electrically connected to the first time-length selection signal wire, the current data lines in odd columns are electrically connected to the second current selection signal wire, and the time-length data lines in odd columns are electrically connected to the second time-length selection signal wire.

In an exemplary embodiment, when the pixel unit performs display, the first time-length selection signal wire $DT\_MUX_1$ provides a first valid level signal, the second time-length selection signal wire $DT\_MUX_2$ provides a second valid level signal, and the first current selection signal wire $DI\_MUX_1$ provides a third valid level signal, and the second current selection signal wire $DI\_MUX_2$ provides a fourth valid level signal. In an exemplary embodiment, as shown in FIG. 4, an end time of the first valid level signal is earlier than a start time of the second valid level signal, an end time of the third valid level signal is earlier than a start time of the fourth valid level signal, and an end time of the second valid level signal is earlier than a start time of the third valid level signal.

Since two adjacent columns of current data lines are electrically connected to different current selection signal wires, two adjacent columns of time-length data lines are electrically connected to different time-length selection signal wires, the end time of the first valid level signal is earlier than the start time of the second valid level signal, the end time of the third valid level signal is earlier than the start time of the fourth valid level signal, and the end time of the second valid level signal is earlier than the start time of the third valid level signal, signals of the first time-length selection signal wire and the second time-length selection signal wire are of valid levels during different writing phases. Therefore, in a writing phase of a row of pixel circuits, when one of the signal wires between the $i^{th}$ column of pixel units and the $(i+1)^{th}$ column of pixel units is in a floating state, a signal voltage of the other signal wire has already completed the high and low level switching and remains unchanged. Thus, there will be no interference between the adjacent signal wires.

When the time-length data line is connected to the first time-length selection signal wire, the time-length data line is in a floating state after the first valid level signal is ended. When the time-length data line is connected to the second time-length selection signal wire, the time-length data line is in a floating state after the second valid level signal is ended.

When the current data line is connected to the first current selection signal wire, the current data line is in a floating state after the third valid level signal is ended. When the current data line is connected to the second current selection signal wire, the current data line is in a floating state after the fourth valid level signal is ended.

In an exemplary embodiment, a duration of the first valid level signal may be equal to a duration of the second valid level signal.

In an exemplary embodiment, a duration of the third valid level signal may be equal to a duration of the fourth valid level signal.

In an exemplary embodiment, the duration of the third valid level signal may be greater than the duration of the first valid level signal.

In an exemplary embodiment, as shown in FIG. 2, the display panel may further include: M scanning signal wires $G_1$ to $G_M$ sequentially arranged along a column direction, and M reset signal wires (not shown in the figure) sequentially arranged along the column direction, M light-emitting signal wires (not shown in the figure) sequentially arranged along the column direction. The pixel circuit may also include: a scanning signal terminal, a reset signal terminal, and a light-emitting signal terminal.

For each pixel circuit in an $m^{th}$ row of pixel units, the scanning signal terminal of the pixel circuit is electrically connected to an $m^{th}$ row of scanning signal wire $G_m$, the reset signal terminal of the pixel circuit is electrically connected to an $m^{th}$ row of reset signal wire, and the light-emitting signal terminal of the pixel circuit is electrically connected to an $m^{th}$ row of light-emitting signal wire, where $1 \le m \le M$.

Figure 5:
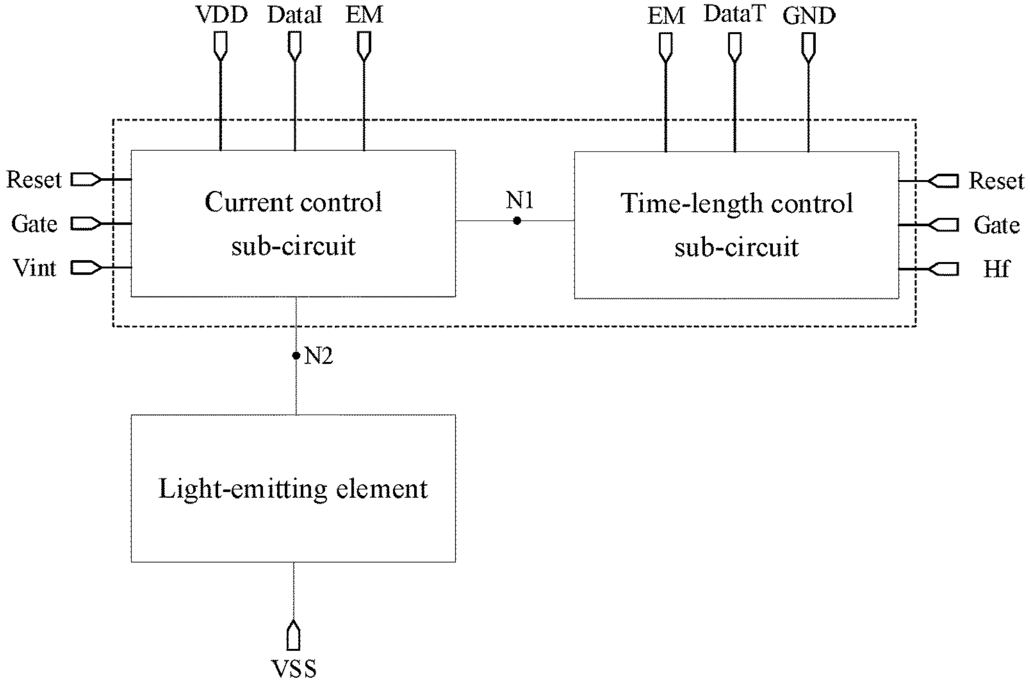
FIG. 5 is a schematic structural diagram of a pixel circuit according to an exemplary embodiment.

FIG. 5 is a schematic structural diagram of a pixel circuit according to an exemplary embodiment. As shown in FIG. 5, in an exemplary embodiment, the pixel circuit includes: a current control sub-circuit and a time-length control sub-circuit. The current control sub-circuit is electrically connected to a current data terminal DataI, a scanning signal terminal Gate, a reset signal terminal Reset, an initial signal terminal Vint, a light-emitting signal terminal EM, a first power terminal VDD, a first node N1, and a second node N2, respectively, and is arranged to provide a drive current to the second node N2 under the control of the current data terminal DataI, the scanning signal terminal Gate, the reset signal terminal Reset, the initial signal terminal Vint, the light-emitting signal terminal EM, the first power terminal VDD, and the first node N1. The time-length control sub-circuit is electrically connected to a scanning signal terminal Gate, a time-length data terminal DataT, a ground terminal GND, a reset signal terminal Reset, a light-emitting signal terminal EM, a high-frequency input terminal Hf and the first node N1, respectively, and is arranged to provide a signal of the light-emitting signal terminal EM or a signal of the high-frequency input terminal Hf to the first node N1 under the control of the scanning signal terminal Gate, the time-length data terminal DataT, the ground terminal GND, the light-emitting signal terminal EM, the reset signal terminal Reset, and the high-frequency input terminal Hf.

In an exemplary embodiment, the first power terminal VDD is arranged to transmit a direct-current voltage signal and continuously provide a high-level signal, such as a direct-current high voltage. A second power terminal VSS is arranged to transmit a direct-current voltage signal and continuously provide a low-level signal, for example, a direct-current low voltage.

In an exemplary embodiment, the signal of the high-frequency input terminal Hf is a high-frequency pulse signal. For example, in an image frame, the signal of the high-frequency input terminal Hf includes multiple pulses. Exemplarily, a frequency of the signal of the high-frequency input terminal Hf is greater than a frequency of the signal of the light-emitting signal terminal EM. For example, in a unit time, the number of times the signal of the high-frequency input terminal Hf has a valid level time period is greater than the number of times the signal of the light-emitting signal terminal EM has a valid level time period.

In an exemplary embodiment, the signal of the high-frequency input terminal Hf is a high-frequency pulse signal. For example, the frequency of the signal of the high-frequency input terminal Hf ranges from 3000 Hz to 60000 Hz, for example, it may be 3000 Hz or 60000 Hz. For example, the frequency of the light-emitting signal terminal EM ranges from 60 Hz to 120 Hz, for example, it may be 60 Hz or 120 Hz. For example, the frame frequency of the display panel is 60 Hz, that is, within Is, the display panel can display 60 frames of images, and the display time length of each frame of image is equal. In this way, when the signal of the high-frequency input terminal Hf is a high-frequency signal with a frequency of 3000 Hz, in an image frame, if the light-emitting element is required to emit light with low-gray tone brightness, the light-emitting element can receive about 50 valid time periods of the high-frequency signal.

In an exemplary embodiment, the signal of the scanning signal terminal or high-frequency input terminal is transmitted to the current control sub-circuit by controlling the time-length control sub-circuit, to control an ON (Start) frequency of the current control sub-circuit, and to control a frequency of forming a conductive path by the pixel circuit and the light-emitting element, so that a frequency of transmitting the drive current to the light-emitting element can be controlled. The frequency of forming the conductive path determines a total time length of the light-emitting element. The total time length of the light-emitting element is a superposition of sub-time lengths of the light-emitting element when forming the conductive path multiple times. Thus, a luminous intensity of the light-emitting element can be controlled by controlling an amplitude of the drive current, thereby realizing gray tone display of the pixel unit.

In an exemplary embodiment, a value range of the amplitude of the drive current may be within a range in which the light-emitting element works with high and stable luminance efficiency, the uniformity of chromaticity coordinates is good, and a dominant wavelength of emission is stable, for example, a range in which the drive current amplitude is large. Therefore, the signal provided by the current data terminal when a gray tone displayed by the pixel unit is greater than a threshold gray tone may have the same value range as the signal provided by the current data terminal when the gray tone displayed by the pixel unit is smaller than the threshold gray tone.

When the gray tone displayed by the pixel unit is greater than the threshold gray tone, the time-length control sub-circuit transmits the signal of the light-emitting signal terminal to the current control sub-circuit. In a light-emitting phase of the pixel circuit, the current control sub-circuit is always in an ON state under the control of the light-emitting signal terminal, the pixel circuit and the light-emitting element always form the conductive path, and the drive current is continuously transmitted to the light-emitting element. Because the gray tone displayed by the pixel unit is greater than the threshold gray tone, the amplitude of the drive current corresponding thereto is relatively high, the light-emitting elements work under the driving of the drive signal with the higher amplitude, and the working efficiency of the light-emitting element is ensured.

When the gray tone displayed by the pixel unit is less than the threshold gray tone, the time-length control sub-circuit transmits the signal of the high-frequency input terminal to the current control sub-circuit. In a light-emitting stage of the pixel circuit, the current control sub-circuit is an ON an OFF state alternatively under the control of the high-frequency pulse signal of the high-frequency input terminal, so that the drive current is intermittently transmitted to the light-emitting element, and the light-emitting element periodically receives the drive current. For example, the light-emitting element stops for a period of time after receiving the drive current for a period of time, and then stops again for some time after receiving the drive current for a period of time. Thus, the time for forming the conductive path by the pixel circuit and the light-emitting element is shortened, and the time for transmitting the drive circuit to the light-emitting element is shortened. Therefore, when the gray tone displayed by the pixel unit where the pixel circuit is located is less than the threshold gray tone, the amplitude of the drive current can be maintained in a higher value range or kept at a larger fixed amplitude value; by changing the working time length of the light-emitting element, the pixel unit is allowed to realize the corresponding low-gray tone display, thereby improving the working efficiency of the light-emitting element, avoiding the problem of low working efficiency and high power consumption of the light-emitting element when the low-gray tone display is implemented with small current amplitude, avoiding reduction of the gray tone display uniformity, avoiding the color shift in display, and improving the display effect of the display panel.

Exemplarily, the amplitude of the drive current is related to a current data signal received at the current data terminal. The current data signal may be a signal that enables the light-emitting element to have a higher working efficiency. For example, the current data signal may be a signal that changes within a higher amplitude range or a signal with a higher fixed amplitude. In this case, the pixel circuit controls, by the current control sub-circuit and the time-length control sub-circuit, the time and frequency of transmitting the drive current to the light-emitting element, to control the corresponding gray tone display of the pixel unit.

In an image frame, in the case where the gray tone displayed by the pixel unit is less than the threshold gray tone, compared with the circumstance that flickering to the human eyes will be obvious when the light-emitting element works for a short time and then being idle for a long time, the light-emitting element in the embodiment of the present disclosure is intermittently in a working state, that is, the light-emitting element is in a working state and an idle state alternatively with high alternating frequency, that is, the light-emitting element has a high light-dark alternating frequency, and flickering is not easy to be captured by the human eyes, thereby improving the display effect.

In an exemplary embodiment, when the gray tone displayed by the pixel unit where the pixel circuit is located is greater than the threshold gray tone, a signal of the time-length data terminal DataT is an invalid level signal during a valid time period of a signal received by the reset signal terminal Reset, and a signal of the time-length data terminal DataT is a valid level signal during a valid time period of a signal received by the light-emitting signal terminal EM. When the gray tone displayed by the pixel unit where the pixel circuit is located is less than the threshold gray tone, a signal of the time-length data terminal DataT is a valid level signal during a valid time period of a signal received by the reset signal terminal Reset, and a signal at the time-length data terminal DataT is an invalid level signal during a valid time period of a signal received by the light-emitting signal terminal EM.

In an exemplary embodiment, a first electrode of the light-emitting element is electrically connected to a second node N2. A second electrode of the light-emitting element is electrically connected to the second power terminal VSS. The first electrode of the light-emitting element is an anode thereof, and the second electrode of the light-emitting element is a cathode thereof.

Figure 6:
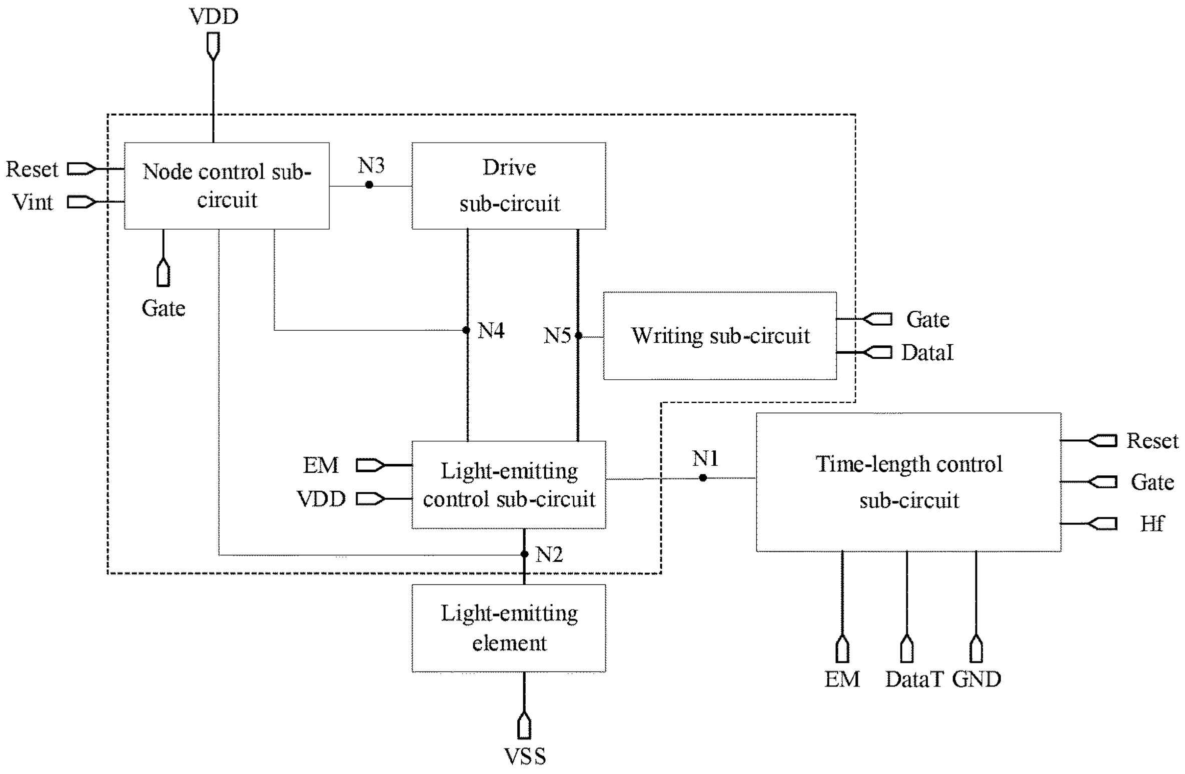
FIG. 6 is a schematic structural diagram of a current control sub-circuit according to an exemplary embodiment.

FIG. 6 is a schematic structural diagram of a current control sub-circuit according to an exemplary embodiment. As shown in FIG. 6, in an exemplary embodiment, the current control sub-circuit may include: a node control sub-circuit, a writing sub-circuit, a drive sub-circuit, and a light-emitting control sub-circuit. The node control sub-circuit is electrically connected to the scanning signal terminal Gate, the reset signal terminal Reset, the initial signal terminal Vint, the second node N2, a third node N3, a fourth node N4, and the first power terminal VDD, respectively, and is arranged to provide a signal of the initial signal terminal Vint to the second node N2 and the third node N3 and provide a signal of the third node N3 to the fourth node N4 under the control of the reset signal terminal Reset and the scanning signal terminal Gate. The writing sub-circuit is electrically connected to the scanning signal terminal Gate, the current data terminal DataI, and a fifth node N5, respectively, and is arranged to provide a signal of the current data terminal DataI to the fifth node N5 under the control of the scanning signal terminal Gate. The drive sub-circuit is electrically connected to the third node N3, the fourth node N4, and the fifth node N5, respectively, and is arranged to provide the drive current to the fourth node N4 under the control of the third node N3 and the fifth node N5. The light-emitting control sub-circuit is electrically connected to the light-emitting signal terminal EM, the first node N1, the second node N2, the fourth node N4, the fifth node N5, and the first power terminal VDD, respectively, and is arranged to provide a signal of the first power terminal VDD to the fifth node N5 and provide a signal of the fourth node N4 to the second node N2 under the control of the first node N1 and the light-emitting signal terminal EM.

Figure 7:
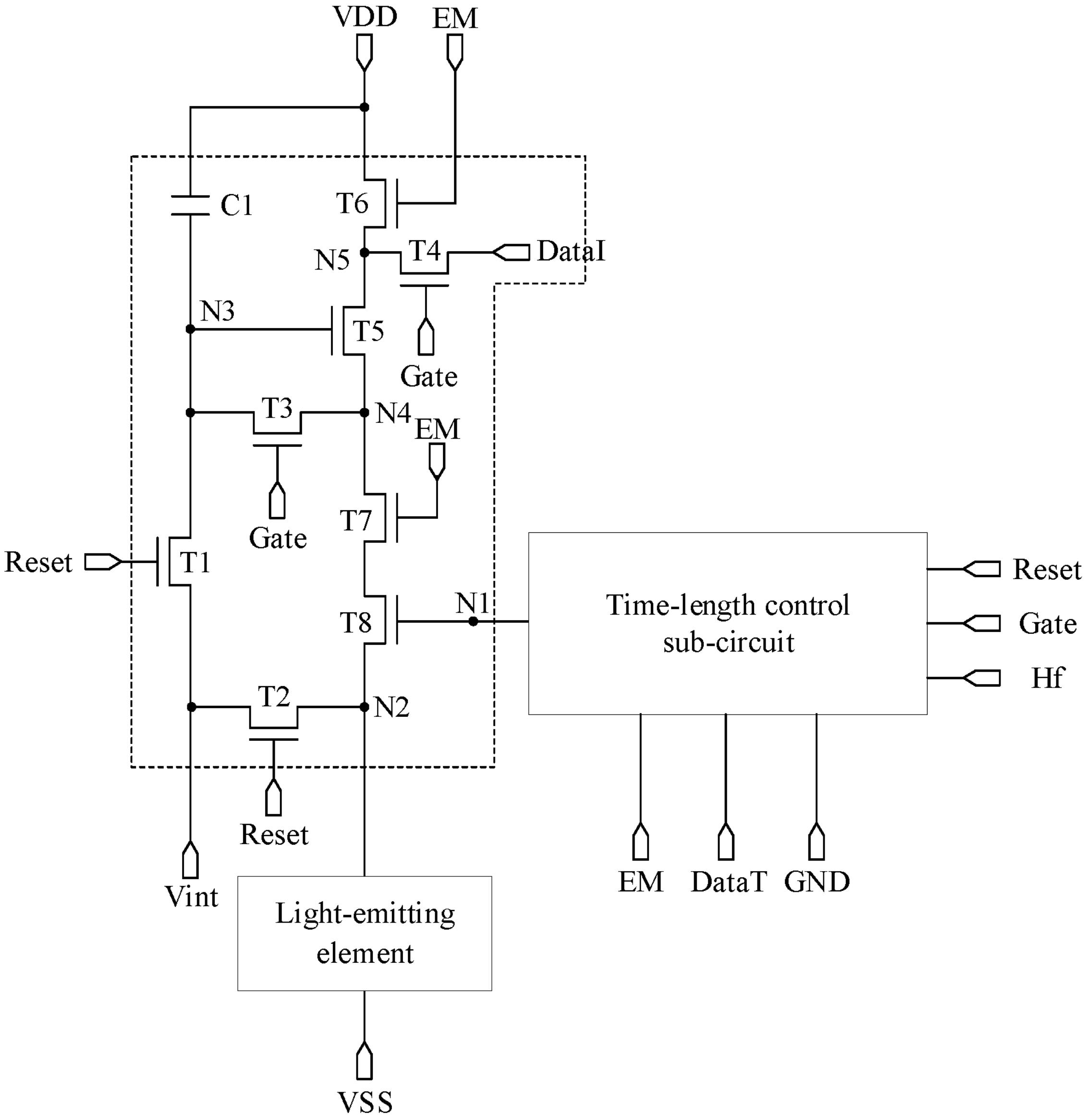
FIG. 7 is an equivalent circuit diagram of a current control sub-circuit according to an exemplary embodiment.

FIG. 7 is an equivalent circuit diagram of a current control sub-circuit according to an exemplary embodiment. As shown in FIG. 7, in the current control sub-circuit according to the exemplary embodiment, the node control sub-circuit may include: a first transistor T1, a second transistor T2, a third transistor T3, and a first capacitor C1; the writing sub-circuit may include: a fourth transistor T4; the drive sub-circuit may include: a fifth transistor T5; and the light-emitting control sub-circuit may include: a sixth transistor T6, a seventh transistor T7, and an eighth transistor T8.

A control electrode of the first transistor T1 is electrically connected to the reset signal terminal Reset, a first electrode of the first transistor T1 is electrically connected to the initial signal terminal Vint, and a second electrode of the first transistor T1 is electrically connected to the third node N3. A control electrode of the second transistor T2 is electrically connected to the reset signal terminal Reset, a first electrode of the second transistor T2 is electrically connected to the initial signal terminal Vint, and a second electrode of the second transistor T2 is electrically connected to the second node N2. A control electrode of the third transistor T3 is electrically connected to the scanning signal terminal Gate, a first electrode of the third transistor T3 is electrically connected to the third node N3, and a second electrode of the third transistor T3 is electrically connected to the fourth node N4. A first terminal of the first capacitor C1 is electrically connected to the third node N3, and a second terminal of the first capacitor C1 is electrically connected to the first power terminal VDD. A control electrode of the fourth transistor T4 is electrically connected to the scanning signal terminal Gate, a first electrode of the fourth transistor T4 is electrically connected to the fifth node N5, and a second electrode of the fourth transistor T4 is electrically connected to the current data terminal DataI. A control terminal of the fifth transistor T5 is electrically connected to the third node N3, a first electrode of the fifth transistor T5 is electrically connected to the fifth node N5, and a second electrode of the fifth transistor T5 is electrically connected to the fourth node N4. A control terminal of the sixth transistor T6 is electrically connected to the light-emitting signal terminal EM, a first electrode of the sixth transistor T6 is electrically connected to the first power terminal VDD, and a second electrode of the sixth transistor T6 is electrically connected to the fifth node N5. A control electrode of the seventh transistor T7 is electrically connected to the light-emitting signal terminal EM, a first electrode of the seventh transistor T7 is electrically connected to the fourth node N4, and a second electrode of the seventh transistor T7 is electrically connected to a first electrode of the eighth transistor T8. A control electrode of the eighth transistor T8 is electrically connected to the first node N1, and a second electrode of the eighth transistor T8 is electrically connected to the second node N2.

In an exemplary embodiment, the first transistor T1, the second transistor T2, the third transistor T3, the fourth transistor T4, the sixth transistor T6, the seventh transistor T7, and the eighth transistor T8 may be switch transistors.

In an exemplary embodiment, the fifth transistor T5 may be a drive transistor.

Figure 8:
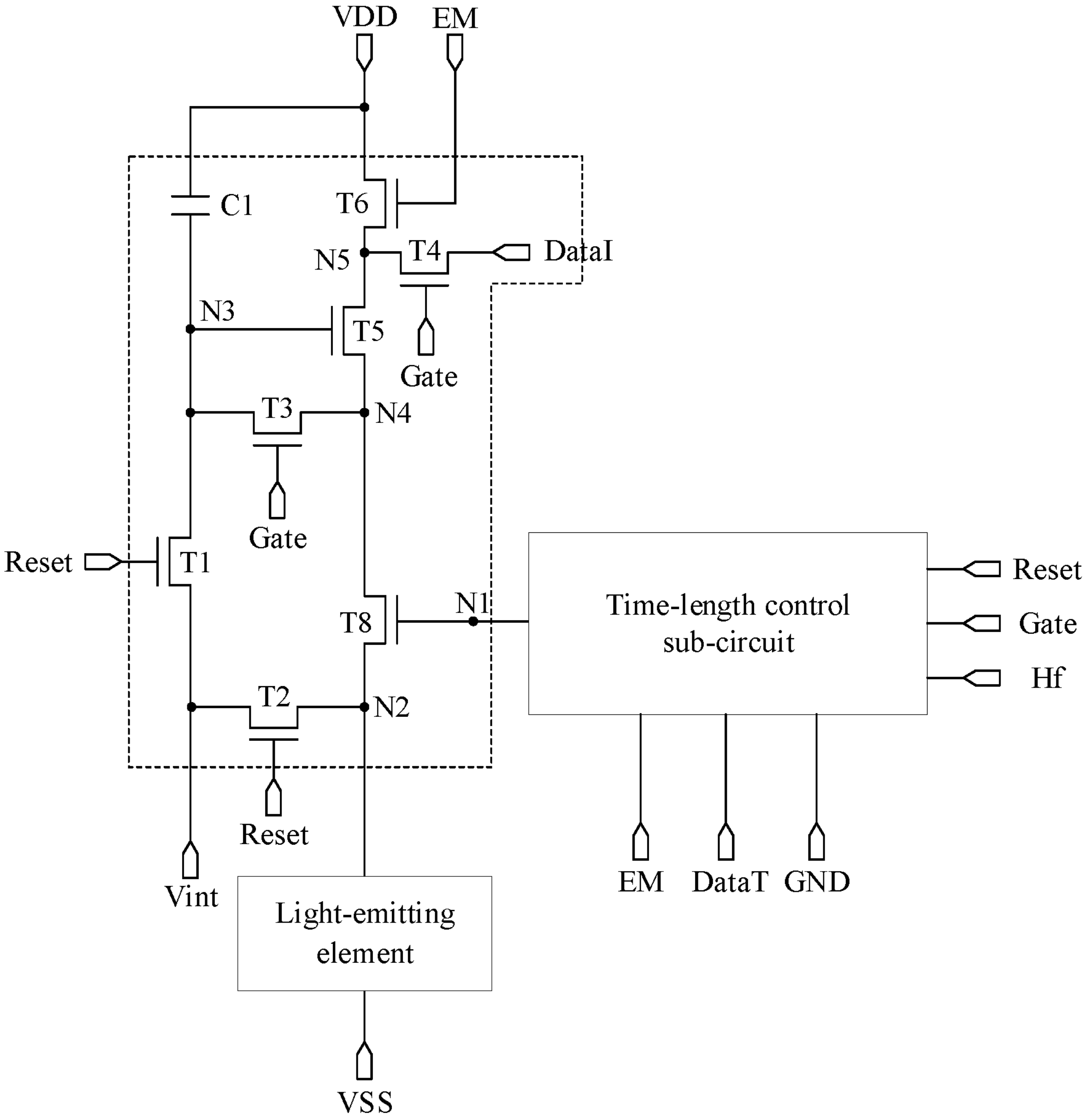
FIG. 8 is an equivalent circuit diagram of a current control sub-circuit according to another exemplary embodiment.

FIG. 8 is an equivalent circuit diagram of a current control sub-circuit according to another exemplary embodiment. As shown in FIG. 8, in the current control sub-circuit according to the exemplary embodiment, the node control sub-circuit may include: a first transistor T1, a second transistor T2, a third transistor T3, and a first capacitor C1; the writing sub-circuit may include: a fourth transistor T4; the drive sub-circuit may include: a fifth transistor T5; and the light-emitting control sub-circuit may include: a sixth transistor T6, and an eighth transistor T8. A control electrode of the first transistor T1 is electrically connected to the reset signal terminal Reset, a first electrode of the first transistor T1 is electrically connected to the initial signal terminal Vint, and a second electrode of the first transistor T1 is electrically connected to the third node N3. A control electrode of the second transistor T2 is electrically connected to the reset signal terminal Reset, a first electrode of the second transistor T2 is electrically connected to the initial signal terminal Vint, and a second electrode of the second transistor T2 is electrically connected to the second node N2. A control electrode of the third transistor T3 is electrically connected to the scanning signal terminal Gate, a first electrode of the third transistor T3 is electrically connected to the third node N3, and a second electrode of the third transistor T3 is electrically connected to the fourth node N4. A first terminal of the first capacitor C1 is electrically connected to the third node N3, and a second terminal of the first capacitor C1 is electrically connected to the first power terminal VDD. A control electrode of the fourth transistor T4 is electrically connected to the scanning signal terminal Gate, a first electrode of the fourth transistor T4 is electrically connected to the fifth node N5, and a second electrode of the fourth transistor T4 is electrically connected to the current data terminal DataI. A control terminal of the fifth transistor T5 is electrically connected to the third node N3, a first electrode of the fifth transistor T5 is electrically connected to the fifth node N5, and a second electrode of the fifth transistor T5 is electrically connected to the fourth node N4. A control terminal of the sixth transistor T6 is electrically connected to the light-emitting signal terminal EM, a first electrode of the sixth transistor T6 is electrically connected to the first power terminal VDD, and a second electrode of the sixth transistor T6 is electrically connected to the fifth node N5. A control electrode of the eighth transistor T8 is electrically connected to the first node N1, a first electrode of the eighth transistor T8 is electrically connected to the fourth node, and a second electrode of the eighth transistor T8 is electrically connected to the second node N2.

In an exemplary embodiment, the first transistor T1, the second transistor T2, the third transistor T3, the fourth transistor T4, the sixth transistor T6, and the eighth transistor T8 may be switch transistors.

In an exemplary embodiment, the fifth transistor T5 may be a drive transistor.

FIG. 7 and FIG. 8 illustrate exemplary structures of the current control sub-circuit. The implementation of the current control sub-circuit is not limited to this.

Figure 9:
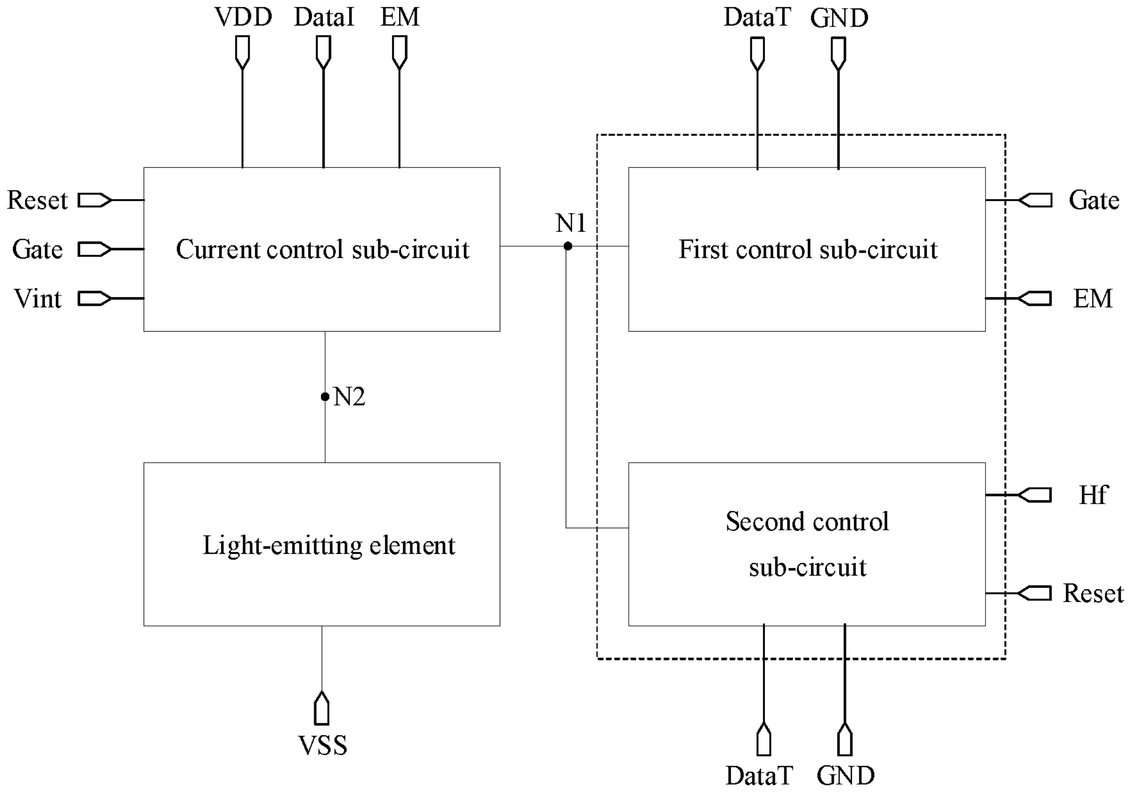
FIG. 9 is a schematic structural diagram of a time-length control sub-circuit according to an exemplary embodiment.

FIG. 9 is a schematic structural diagram of a time-length control sub-circuit according to an exemplary embodiment. As shown in FIG. 9, the time-length control sub-circuit according to an exemplary embodiment includes: a first control sub-circuit and a second control sub-circuit. The first control sub-circuit is electrically connected to the time-length data terminal DataT, the scanning signal terminal Gate, the ground terminal GND, the light-emitting signal terminal EM, and the first node N1, respectively, and is arranged to provide the signal of the light-emitting signal terminal EM to the first node N1 under the control of the current data terminal DataI, the scanning signal terminal Gate, and the ground terminal GND. The second control sub-circuit is electrically connected to the time-length data terminal DataT, the reset signal terminal Reset, the ground terminal GND, the high-frequency input terminal Hf, and the first node N1, respectively, and is arranged to provide the signal of the high-frequency input terminal Hf to the first node N1 under the control of the time-length data terminal DataT, the reset signal terminal Reset, and the ground terminal GND.

Figure 10:
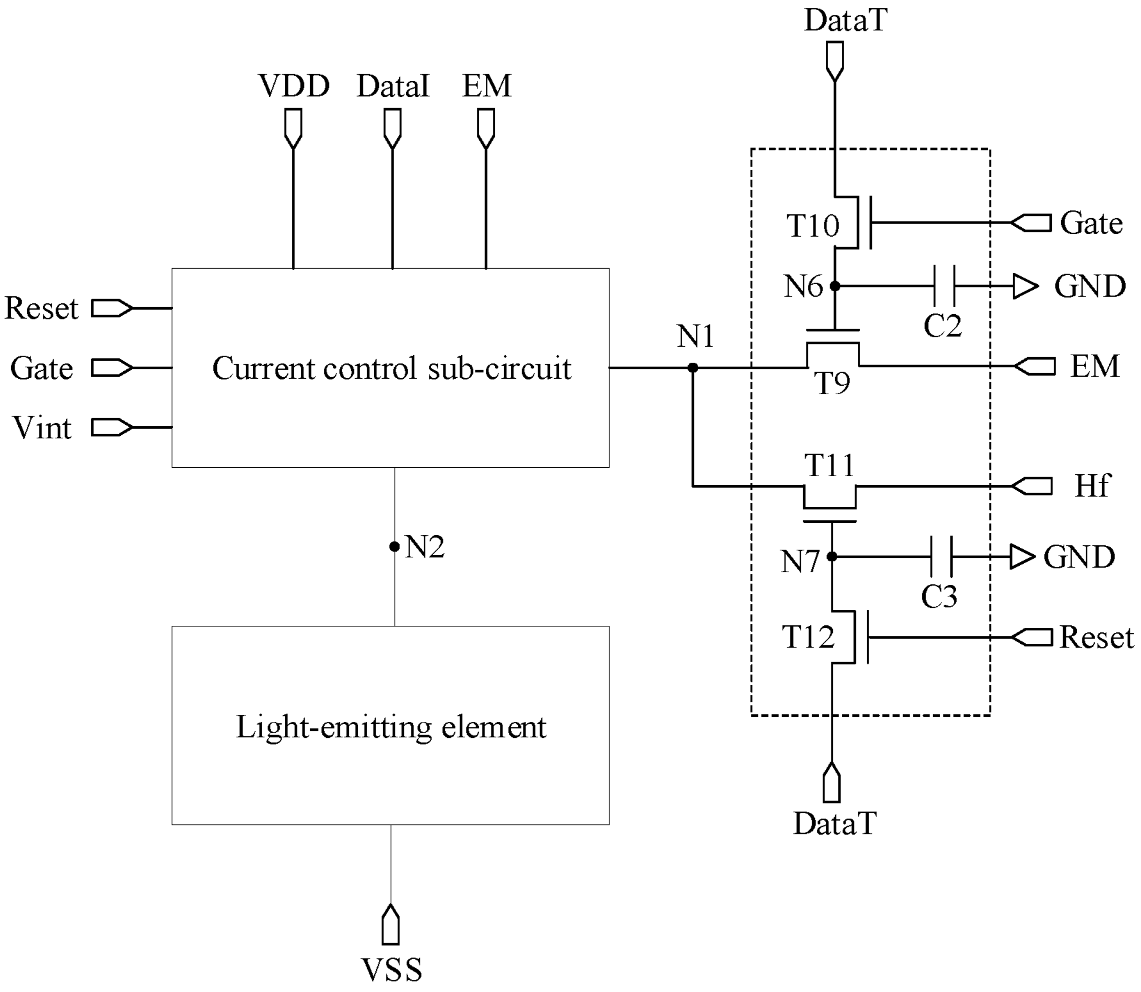
FIG. 10 is an equivalent circuit diagram of a time-length control sub-circuit according to an exemplary embodiment.

FIG. 10 is an equivalent circuit diagram of a time-length control sub-circuit according to an exemplary embodiment. As shown in FIG. 10, in the time-length control sub-circuit according to an exemplary embodiment, the first control sub-circuit may include: a ninth transistor T9, a tenth transistor T10, and a second capacitor C2; and the second control sub-circuit may include: an eleventh transistor T11, a twelfth transistor T12, and a third capacitor C3. A control electrode of the ninth transistor T9 is electrically connected to a sixth node N6, a first electrode of the ninth transistor T9 is electrically connected to the light-emitting signal terminal EM, and a second electrode of the ninth transistor T9 is electrically connected to the first node N1. A control electrode of the tenth transistor T10 is electrically connected to the scanning signal terminal Gate, a first electrode of the tenth transistor T10 is electrically connected to the time-length data terminal DataT, and a second electrode of the tenth transistor T10 is electrically connected to the sixth node N6. A first terminal of the second capacitor C2 is electrically connected to the sixth node N6, and a second terminal of the second capacitor C2 is electrically connected to the ground terminal GND. A control electrode of the eleventh transistor T11 is electrically connected to a seventh node N7, a first electrode of the eleventh transistor T11 is electrically connected to the high-frequency input terminal Hf, and a second electrode of the eleventh transistor T11 is electrically connected to the first node N1. A control electrode of the twelfth transistor T12 is electrically connected to the reset signal terminal Reset, a first electrode of the twelfth transistor T12 is electrically connected to the time-length data terminal DataT, and a second electrode of the twelfth transistor T12 is electrically connected to the seventh node N7. A first terminal of the third capacitor C3 is electrically connected to the seventh node N7, and a second terminal of the third capacitor C3 is electrically connected to the ground terminal GND.

In an exemplary embodiment, the ninth transistor T9, the tenth transistor T10, the eleventh transistor T11, and the twelfth transistor T12 may be switch transistors.

FIG. 10 illustrates an exemplary structure of the time-length control sub-circuit. The implementation of the time-length control sub-circuit is not limited to this.

Figure 11:
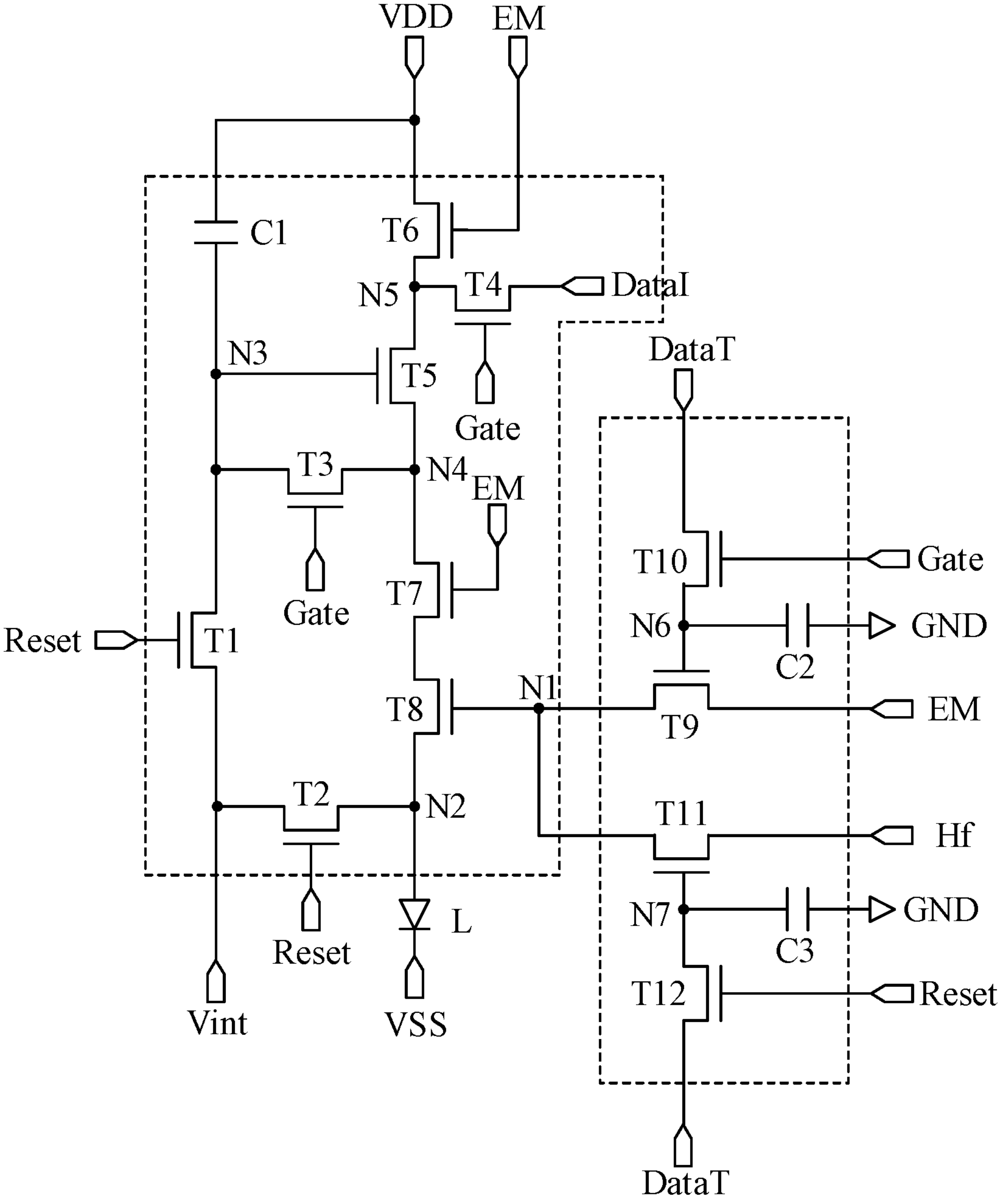
FIG. 11 is an equivalent circuit diagram of a pixel circuit according to an exemplary embodiment.

FIG. 11 is an equivalent circuit diagram of a pixel circuit according to an exemplary embodiment. As shown in FIG. 11, in the pixel circuit according to an exemplary embodiment, the current control sub-circuit may include: a first transistor T1, a second transistor T2, a third transistor T3, a first capacitor C1, a fourth transistor T4, a fifth transistor T5, a sixth transistor T6, a seventh transistor T7, and an eighth transistor T8; and the time-length control sub-circuit may include: a ninth transistor T9, a tenth transistor T10, a second capacitor C2, an eleventh transistor T11, a twelfth transistor T12, and a third capacitor C3. A control electrode of the first transistor T1 is electrically connected to the reset signal terminal Reset, a first electrode of the first transistor T1 is electrically connected to the initial signal terminal Vint, and a second electrode of the first transistor T1 is electrically connected to the third node N3. A control electrode of the second transistor T2 is electrically connected to the reset signal terminal Reset, a first electrode of the second transistor T2 is electrically connected to the initial signal terminal Vint, and a second electrode of the second transistor T2 is electrically connected to the second node N2. A control electrode of the third transistor T3 is electrically connected to the scanning signal terminal Gate, a first electrode of the third transistor T3 is electrically connected to the third node N3, and a second electrode of the third transistor T3 is electrically connected to the fourth node N4. A first terminal of the first capacitor C1 is electrically connected to the third node N3, and a second terminal of the first capacitor C1 is electrically connected to the first power terminal VDD. A control electrode of the fourth transistor T4 is electrically connected to the scanning signal terminal Gate, a first electrode of the fourth transistor T4 is electrically connected to the fifth node N5, and a second electrode of the fourth transistor T4 is electrically connected to the current data terminal DataI. A control terminal of the fifth transistor T5 is electrically connected to the third node N3, a first electrode of the fifth transistor T5 is electrically connected to the fifth node N5, and a second electrode of the fifth transistor T5 is electrically connected to the fourth node N4. A control terminal of the sixth transistor T6 is electrically connected to the light-emitting signal terminal EM, a first electrode of the sixth transistor T6 is electrically connected to the first power terminal VDD, and a second electrode of the sixth transistor T6 is electrically connected to the fifth node N5. A control electrode of the seventh transistor T7 is electrically connected to the light-emitting signal terminal EM, a first electrode of the seventh transistor T7 is electrically connected to the fourth node N4, and a second electrode of the seventh transistor T7 is electrically connected to a first electrode of the eighth transistor T8. A control electrode of the eighth transistor T8 is electrically connected to the first node N1, and a second electrode of the eighth transistor T8 is electrically connected to the second node N2. A control electrode of the ninth transistor T9 is electrically connected to a sixth node N6, a first electrode of the ninth transistor T9 is electrically connected to the light-emitting signal terminal EM, and a second electrode of the ninth transistor T9 is electrically connected to the first node N1. A control electrode of the tenth transistor T10 is electrically connected to the scanning signal terminal Gate, a first electrode of the tenth transistor T10 is electrically connected to the time-length data terminal DataT, and a second electrode of the tenth transistor T10 is electrically connected to the sixth node N6. A first terminal of the second capacitor C2 is electrically connected to the sixth node N6, and a second terminal of the second capacitor C2 is electrically connected to the ground terminal GND. A control electrode of the eleventh transistor T11 is electrically connected to a seventh node N7, a first electrode of the eleventh transistor T11 is electrically connected to the high-frequency input terminal Hf, and a second electrode of the eleventh transistor T11 is electrically connected to the first node N1. A control electrode of the twelfth transistor T12 is electrically connected to the reset signal terminal Reset, a first electrode of the twelfth transistor T12 is electrically connected to the time-length data terminal DataT, and a second electrode of the twelfth transistor T12 is electrically connected to the seventh node N7. A first terminal of the third capacitor C3 is electrically connected to the seventh node N7, and a second terminal of the third capacitor C3 is electrically connected to the ground terminal GND.

In an exemplary embodiment, the first transistor T1 to the twelfth transistor T12 may be P-type transistors, or may be N-type transistors. Adopting the same type of transistors in the pixel circuit may simplify the process flow, reduce the process difficulties of the display panel, and improve the yield of the product.

In some possible implementation modes, the first transistor T1 to the twelfth transistor T12 may include P-type transistors and N-type transistors.

Figure 12:
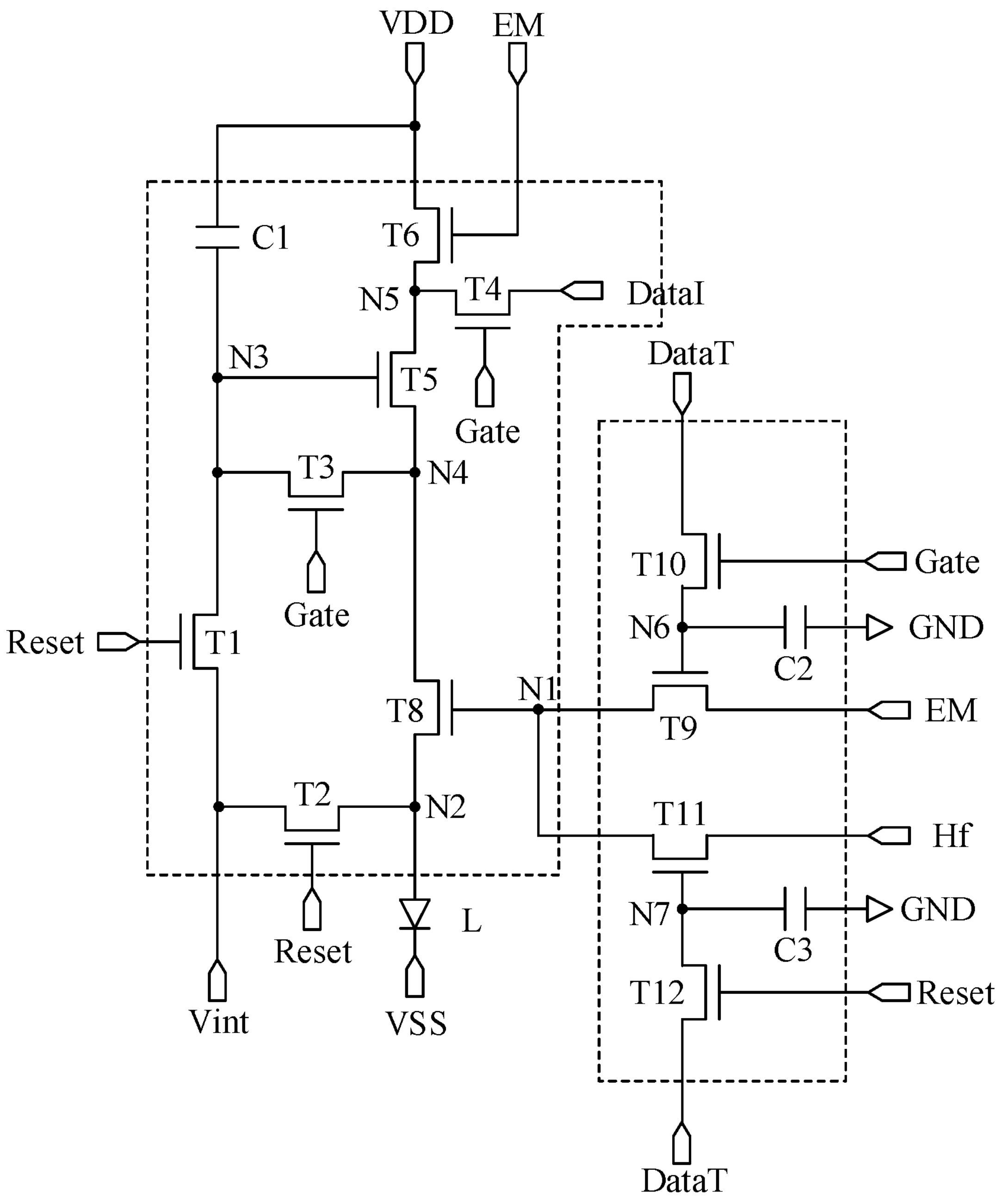
FIG. 12 is an equivalent circuit diagram of a pixel circuit according to another exemplary embodiment.

FIG. 12 is an equivalent circuit diagram of a pixel circuit according to another exemplary embodiment. As shown in FIG. 12, in the pixel circuit according to an exemplary embodiment, the current control sub-circuit may include: a first transistor T1, a second transistor T2, a third transistor T3, a first capacitor C1, a fourth transistor T4, a fifth transistor T5, a sixth transistor T6, and an eighth transistor T8. The time-length control sub-circuit may include: a ninth transistor T9, a tenth transistor T10, a second capacitor C2, an eleventh transistor T11, a twelfth transistor T12, and a third capacitor C3. A control electrode of the first transistor T1 is electrically connected to the reset signal terminal Reset, a first electrode of the first transistor T1 is electrically connected to the initial signal terminal Vint, and a second electrode of the first transistor T1 is electrically connected to the third node N3. A control electrode of the second transistor T2 is electrically connected to the reset signal terminal Reset, a first electrode of the second transistor T2 is electrically connected to the initial signal terminal Vint, and a second electrode of the second transistor T2 is electrically connected to the second node N2. A control electrode of the third transistor T3 is electrically connected to the scanning signal terminal Gate, a first electrode of the third transistor T3 is electrically connected to the third node N3, and a second electrode of the third transistor T3 is electrically connected to the fourth node N4. A first terminal of the first capacitor C1 is electrically connected to the third node N3, and a second terminal of the first capacitor C1 is electrically connected to the first power terminal VDD. A control electrode of the fourth transistor T4 is electrically connected to the scanning signal terminal Gate, a first electrode of the fourth transistor T4 is electrically connected to the fifth node N5, and a second electrode of the fourth transistor T4 is electrically connected to the current data terminal DataI. A control terminal of the fifth transistor T5 is electrically connected to the third node N3, a first electrode of the fifth transistor T5 is electrically connected to the fifth node N5, and a second electrode of the fifth transistor T5 is electrically connected to the fourth node N4. A control terminal of the sixth transistor T6 is electrically connected to the light-emitting signal terminal EM, a first electrode of the sixth transistor T6 is electrically connected to the first power terminal VDD, and a second electrode of the sixth transistor T6 is electrically connected to the fifth node N5. A control electrode of the eighth transistor T8 is electrically connected to the first node N1, a first electrode of the eighth transistor T8 is electrically connected to the fourth node N4, and a second electrode of the eighth transistor T8 is electrically connected to the second node N2. A control electrode of the ninth transistor T9 is electrically connected to a sixth node N6, a first electrode of the ninth transistor T9 is electrically connected to the light-emitting signal terminal EM, and a second electrode of the ninth transistor T9 is electrically connected to the first node N1. A control electrode of the tenth transistor T10 is electrically connected to the scanning signal terminal Gate, a first electrode of the tenth transistor T10 is electrically connected to the time-length data terminal DataT, and a second electrode of the tenth transistor T10 is electrically connected to the sixth node N6. A first terminal of the second capacitor C2 is electrically connected to the sixth node N6, and a second terminal of the second capacitor C2 is electrically connected to the ground terminal GND. A control electrode of the eleventh transistor T11 is electrically connected to a seventh node N7, a first electrode of the eleventh transistor T11 is electrically connected to the high-frequency input terminal Hf, and a second electrode of the eleventh transistor T11 is electrically connected to the first node N1. A control electrode of the twelfth transistor T12 is electrically connected to the reset signal terminal Reset, a first electrode of the twelfth transistor T12 is electrically connected to the time-length data terminal DataT, and a second electrode of the twelfth transistor T12 is electrically connected to the seventh node N7. A first terminal of the third capacitor C3 is electrically connected to the seventh node N7, and a second terminal of the third capacitor C3 is electrically connected to the ground terminal GND.

In an exemplary embodiment, the first transistor T1 to the sixth transistor T6, and the eighth transistor T8 to the twelfth transistor T12 may be P-type transistors or may be N-type transistors. Adopting the same type of transistors in the pixel circuit may simplify the process flow, reduce the process difficulties of the display panel, and improve the yield of the product.

In an exemplary embodiment, the first transistor T1 to the sixth transistor T6, and the eighth transistor T8 to the twelfth transistor T12 may include P-type transistors and N-type transistors.

In an exemplary embodiment, the amplitude of the drive current is related to characteristics of the drive transistor. For pixel circuits that provide drive currents to pixel units of different colors, implementation of photoelectric characteristics of light-emitting elements of the pixel units of different colors may be considered, and different drive capabilities may be achieved by designing a size of the drive transistor. For example, a width-length ratio of the drive transistor of the pixel circuit that provide the drive current to the red pixel unit, and a width-length ratio of the drive transistor of the pixel circuit that provide the drive current to the green pixel unit are different from a width-length ratio of at least two of the drive transistors of the pixel circuit that drive the drive current to the blue pixel unit. In this way, when the pixel units of different colors all display the same gray tone, theoretically, if sizes of the drive transistors in the pixel circuits that provide the driving currents to the pixel units of different colors are exactly the same, the amplitudes of the drive currents of the different pixel units may be difference, that is, the amplitudes of the data signals provided to the pixel circuits of different pixel units are different, resulting in a great increase of design complexity; and by designing the size of the drive transistor in each pixel circuit, for example, by changing the width-length ratio of the drive transistor, a size of the drive signal is adjusted, so that data signals of the same amplitude can be provided to different pixel units.

In an exemplary embodiment, in a case where a gray tone displayed by the pixel unit is greater than a threshold gray tone, when a level of a signal of the reset signal terminal is a valid level signal, a level of a signal of the time-length data terminal is a first invalid level, and when a level of a signal of the scanning signal terminal is a valid level signal, the level of the signal of the time-length data terminal is a first valid level. The first invalid level is a level making the twelfth transistor off, and the first valid level is a level making the ninth transistor on.

In an exemplary embodiment, in a case where a gray tone displayed by the pixel unit is less than a threshold gray tone, when a level of a signal of the reset signal terminal is a valid level signal, a level of a signal of the time-length data terminal is a second valid level, and when a level of a signal of the scanning signal terminal is a valid level signal, the level of the signal of the time-length data terminal is a second invalid level. The second valid level is a level making the twelfth transistor on, and the second invalid level is a level making the ninth transistor off. At this point, a control signal is provided to the first node through the high-frequency input terminal. The high-frequency pulse signal at the high-frequency input terminal controls the light-emitting time length, and a short light-emitting time length is dispersed to a frame of time, so that flickering is caused when the gray tone displayed by the pixel unit is less than the threshold gray tone is reduced.

A pixel circuit according to an exemplary embodiment will be described below through a working process of the pixel circuit.

Figure 13:
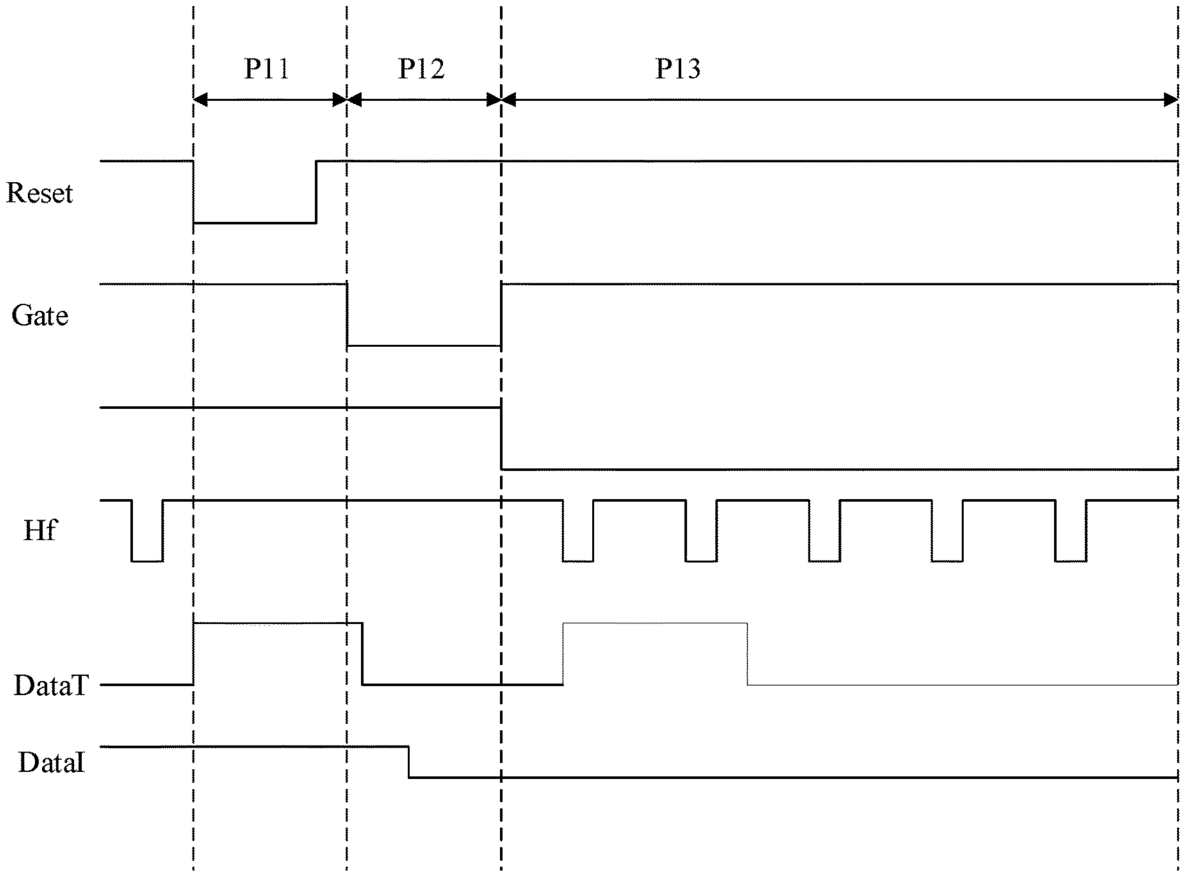
FIG. 13 is a working sequence diagram of the pixel circuit provided in FIG. 11 in a case where a gray tone displayed by a pixel unit is greater than a threshold gray tone.
Figure 14:
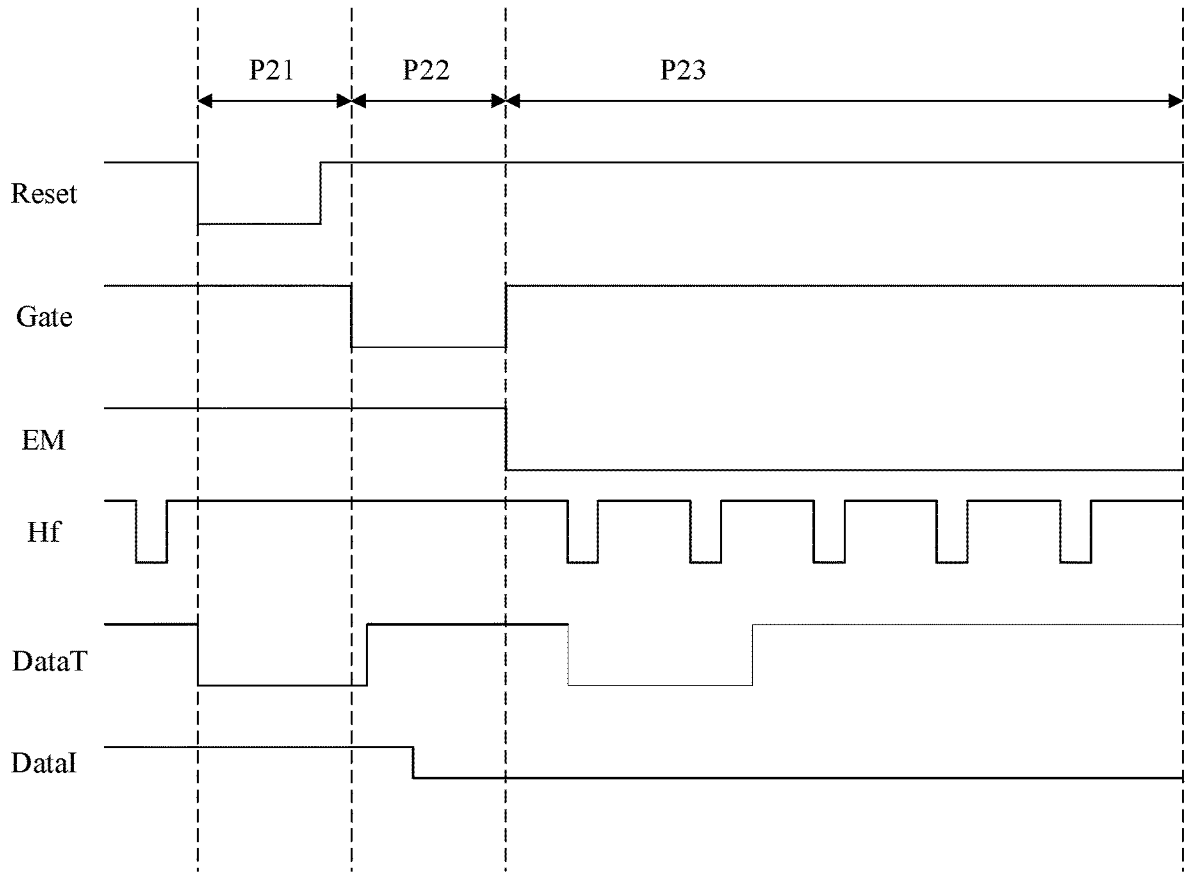
FIG. 14 is a working sequence diagram of the pixel circuit provided in FIG. 11 in a case where a gray tone displayed by a pixel unit is less than a threshold gray tone.

Taking that the first transistor T11 to the twelfth transistor T12 are all P-type transistors in the pixel circuit provided in FIG. 11 as an example, FIG. 13 is a working sequence diagram of the pixel circuit provided in FIG. 11 in a case where a gray tone displayed by a pixel unit is greater than a threshold gray tone. FIG. 14 is a working sequence diagram of the pixel circuit provided in FIG. 11 in a case where a gray tone displayed by a pixel unit is less than a threshold gray tone. As shown in FIGS. 11, 13 and 14, the pixel circuit involved in an exemplary embodiment includes: 12 switch transistors (T1 to T12), 1 driving transistor (T5), and 3 capacitor units (C1 to C3), 8 input terminals (Gate, DT, DI, Reset, Vint, EM, GND and Hf) and 2 power terminals (VDD and VSS).

When the gray tone displayed by the pixel unit is greater than the threshold gray tone, as shown in FIG. 11 and FIG. 13, the working process of the pixel circuit in the pixel unit includes: an initialization phase, a writing phase, and a light-emitting phase.

In a first phase P11, i.e., the initialization phase, the signal of the reset signal terminal Reset is a low-level signal; the first transistor T1 is switched on, so that a signal of the initial signal terminal Vint is written into the third node N3 to reset the third node N3 and charge the first capacitor C1; the second transistor T2 is switched on, so that the signal of the initial signal terminal Vint is written into the second node N2, the second node N2 is electrically connected to an anode of a light-emitting element L, to reset the anode of the light-emitting element L so as to eliminate residual charge of the anode of the light-emitting element L; the twelfth transistor T12 is switched on, so that a signal of the time-length data terminal DataT is written into the seventh node N7 and the third capacitor C3 is charged; because the signal of the time-length data terminal DataT is a high-level signal, the eleventh transistor T11 is cut off, and the signal of the high-frequency input terminal Hf cannot be written into the first node N1.

In a second phase P12, i.e., the writing phase, the signal of the scanning signal terminal Gate is a low-level signal, the fourth transistor T4 is switched on, the signal of the current data terminal DataI is written into the fifth node N5; the third transistor T3 is switched on, then a level V5 of the fifth node N5=Vd, where Vd is a voltage value of the signal of the current data terminal DataI, the first capacitor C1 starts to discharge to charge the third node N3 until a level V3 of the third node N3=Vd+Vth, at this point, the fifth transistor T5 is cut off, where Vth is a threshold voltage of the fifth transistor T5; the tenth transistor T10 is switched on, the signal of the data terminal DataT is written into the sixth node N6, and the second capacitor C2 is charged. Since the signal of the time-length data terminal DataT is a low-level signal, the ninth transistor T9 is switched on, and the signal of the light-emitting signal terminal EM is written into the first node N1. In this phase, the third capacitor C3 starts to discharge, so that a potential of the seventh node N7 remains unchanged, the eleventh transistor T11 is always off, and the signal of the high-frequency input terminal Hf cannot be written into the first node N1.

In a third phase P13, i.e., the light-emitting phase, the signal of the light-emitting signal terminal EM is a low-level signal, the sixth transistor T6 is switched on, and the level V5 of the fifth node N5 is V5=Vdd, where Vdd is a voltage value of the signal at the first power supply terminal VDD; the seventh transistor T7 is switched on, the second capacitor C2 starts to discharge, the ninth transistor T9 is always on, the signal of the light-emitting signal terminal EM is written into the first node N1, and the eighth transistor T8 is switched on. Since the voltage value V3 of the third node N3=Vd+Vth, the fifth transistor T5 is switched on, and the drive current flows into the light-emitting element L.

According to the current formula when the drive transistor is saturated, it can be obtained that a drive current $I_L$ flowing through the light-emitting element L satisfies the following equations.

$$
\begin{aligned}
I_L &= (1/2)K(V_{GS} - Vth)^2 \\
&= (1/2)K(V3 - V5 - Vth)^2 \\
&= (1/2)K(Vd + Vth - Vdd - Vth)^2 \\
&= (1/2)K(Vd - Vdd)^2
\end{aligned}
$$

K is a fixed constant related to process parameters and geometric dimensions of the drive transistor, and $V_{GS}$ is a gate-source voltage difference of the drive transistor.

It can be seen from the derivation of the above current formula that in the light-emitting phase, the drive current output by the fifth transistor T5 is not affected by the threshold voltage of the fifth transistor T5, and is only related to the signal of the current data terminal and the signal of the first power terminal. Therefore, the impact of the threshold voltage of the drive transistor on the drive current is eliminated, uniformity of the display brightness of the display product is ensured, and the display effect is improved.

The working process of a pixel circuit, as shown as the pixel circuit in FIG. 12 is substantially the same as that of the pixel circuit in FIG. 11, except that the pixel circuit in FIG. 11 does not include the seventh transistor T7.

When the gray tone displayed by the pixel unit is less than the threshold gray tone, as shown in FIG. 11 and FIG. 14, the working process of the pixel circuit included in the pixel unit includes: an initialization phase, a writing phase, and a light-emitting phase.

In a first phase P21, i.e., the initialization phase, the signal of the reset signal terminal Reset is a low-level signal; the first transistor T1 is switched on, so that a signal of the initial signal terminal Vint is written into the third node N3 to reset the third node N3 and charge the first capacitor C1; the second transistor T2 is switched on, so that the signal of the initial signal terminal Vint is written into the second node N2, the second node N2 is electrically connected to an anode of a light-emitting element L, to reset the anode of the light-emitting element L so as to eliminate residual charge of the anode of the light-emitting element L; the twelfth transistor T12 is switched on, so that a signal of the time-length data terminal DataT is written into the seventh node N7 and the third capacitor C3 is charged; because the signal of the time-length data terminal DataT is a low-level signal, the eleventh transistor T11 is switched on, and the signal of the high-frequency input terminal Hf is written into the first node N1.

In a second phase P22, i.e., the writing phase, the signal of the scanning signal terminal Gate is a low-level signal, the fourth transistor T4 is switched on, the signal of the current data terminal DataI is written into the fifth node N5; the third transistor T3 is switched on, then a level V5 of the fifth node N5=Vd, where Vd is a voltage value of the signal of the current data terminal DataI, the first capacitor C1 starts to discharge to charge the third node N3 until a level V3 of the third node N3=Vd+Vth, at this point, the fifth transistor T5 is cut off, where Vth is a threshold voltage of the fifth transistor T5; the tenth transistor T10 is switched on, the signal of the data terminal DataT is written into the sixth node N6, and the second capacitor C2 is charged. Since the signal of the time-length data terminal DataT is a high-level signal, the ninth transistor T9 is cut off, and the signal of the light-emitting signal terminal EM cannot be written into the first node N1. In this phase, the third capacitor C3 starts to discharge, so that a potential of the seventh node N7 remains unchanged, the eleventh transistor T11 is switched on, and the signal of the high-frequency input terminal Hf is written into the first node N1.

In a third phase P23, i.e., the light-emitting phase, the signal of the light-emitting signal terminal EM is a low-level signal, the sixth transistor T6 is switched on, and the level V5 of the fifth node N5 is V5=Vdd, where Vdd is a voltage value of the signal at the first power supply terminal VDD; the seventh transistor T7 is switched on, the second capacitor C2 starts to discharge, the ninth transistor T9 is always on, the signal of the light-emitting signal terminal EM is written into the first node N1, and the eighth transistor T8 is switched on. Since the voltage value V3 of the third node N3=Vd+Vth, the fifth transistor T5 is switched on, and the drive current flows into the Micro LED.

According to the current formula when the drive transistor is saturated, it can be obtained that a drive current $I_L$ flowing through the light-emitting element L satisfies the following equations.

$$
\begin{aligned}
I_L &= (1/2)K(V_{GS} - Vth)^2 \\
&= (1/2)K(V3 - V5 - Vth)^2 \\
&= (1/2)K(Vd + Vth - Vdd - Vth)^2 \\
&= (1/2)K(Vd - Vdd)^2
\end{aligned}
$$

K is a fixed constant related to process parameters and geometric dimensions of the drive transistor, and $V_{GS}$ is a gate-source voltage difference of the drive transistor.

It can be seen from the derivation of the above current formula that in the light-emitting phase, the drive current output by the fifth transistor T5 is not affected by the threshold voltage of the fifth transistor T5, and is only related to the signal of the current data terminal and the signal of the first power terminal. Therefore, the impact of the threshold voltage of the drive transistor on the drive current is eliminated, the uniformity of the display brightness of the display product is ensured, and the display effect is improved.

In an exemplary embodiment, in the writing phase, the longer writing time of the signal of the current data terminal may cause prolonging of the threshold compensation time of the pixel circuit. The writing time of the signal of the current data terminal depends on the time that the current selection signal wire of the current data line connected to the current data terminal has the valid level signal. The longer the time that the current selection signal wire has the valid level signal, the longer the writing time of the signal of the current data terminal.

In an exemplary embodiment, when the gray tone displayed by the pixel unit is greater than the threshold gray tone, a control signal is provided to the first node through the light-emitting signal terminal, and at this point, the gray tone of the light-emitting element is controlled through the drive current. When the gray tone displayed by the pixel unit is less than the threshold gray tone, a control signal is provided to the first node through the high-frequency input terminal, and at this point, the gray tone of the light-emitting element is controlled through the drive current and the light-emitting time length. In an exemplary embodiment, the high-frequency pulse signal at the high-frequency input terminal controls the light-emitting time length, and a short light-emitting time length is dispersed to a frame of time, so that flickering caused when the gray tone displayed by the pixel unit is less than the threshold gray tone is reduced.

In an exemplary embodiment, as shown in FIG. 2, the display panel may further include: a multiplexed output selection circuit 20, K current data output lines $SI_1$ to $SI_k$ sequentially arranged in a column direction, and K time-length data output lines $ST_1$ to $ST_K$ sequentially arranged in the column direction, where K=N/2. The multiplexed output selection circuit 20 is electrically connected to N current data lines $DI_1$ to $DI_N$, N time-length data lines $DT_1$ to $DT_N$, a first current selection signal wire $DI\_MUX_1$, a second current selection signal wire $DI\_MUX_2$, a first time-length selection signal wire $DT\_MUX_1$, a second time-length selection signal wire DT_MUX2, K current data output lines, and K time-length data output lines, respectively, and is arranged to output data signals of the K current data lines to the N current data lines in a time-sharing manner and output data signals of the K time-length data output lines to the N time-length data lines in a time-sharing manner under the control of the first current selection signal wire $DI\_MUX_1$, the second current selection signal wire $DI\_MUX_2$, the first time-length selection signal wire $DT\_MUX_1$, and the second time-length selection signal wire $DT\_MUX_2$.

Figure 15:
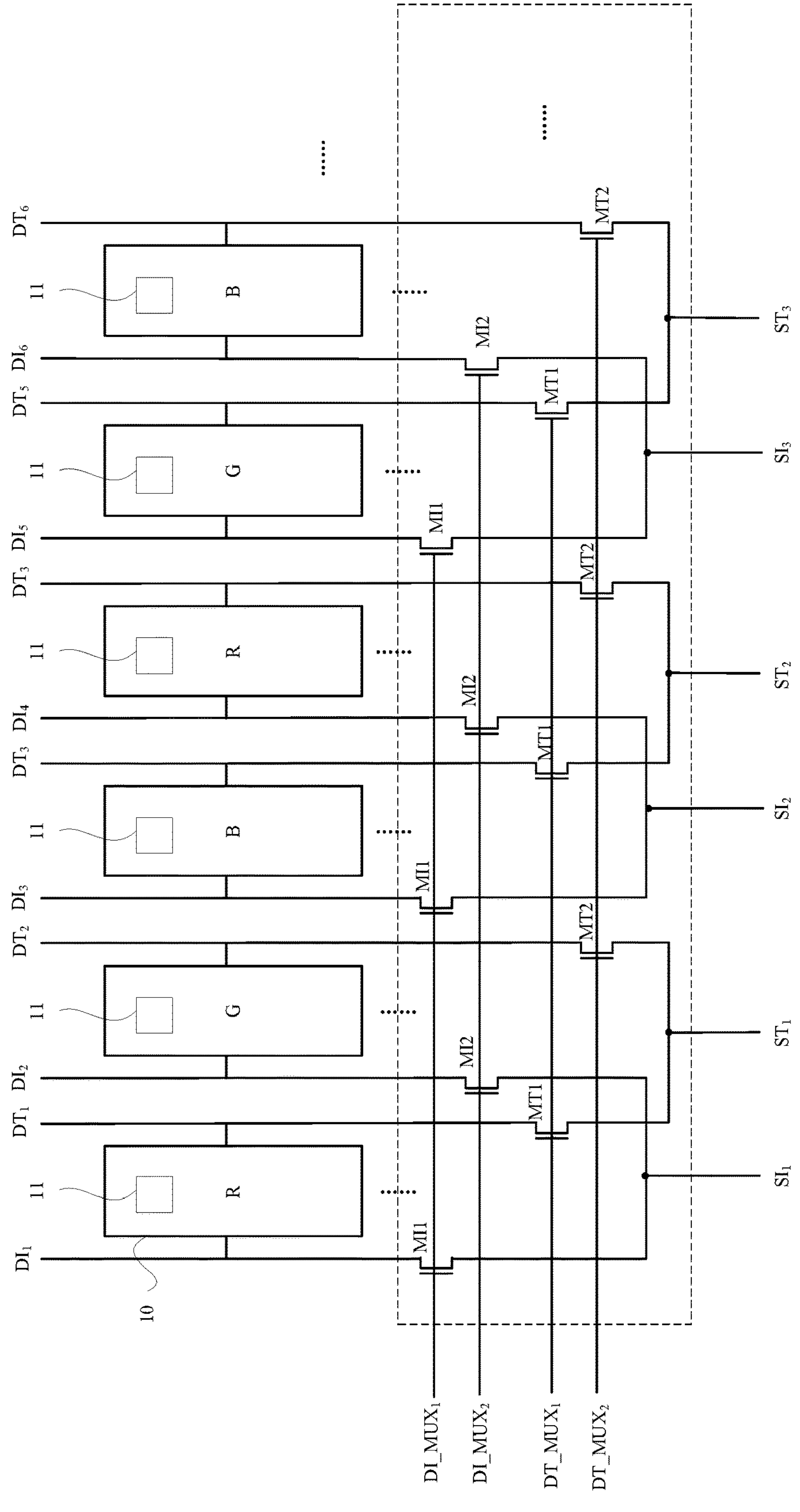
FIG. 15 is an equivalent circuit diagram of a multiplexed output selection circuit according to an exemplary embodiment.

FIG. 15 is an equivalent circuit diagram of a multiplexed output selection circuit according to an exemplary embodiment. As shown in FIG. 15, in an exemplary embodiment, the multiple output selection circuit includes: K first current selection transistors MI1, K second current selection transistors MI2, K first time-length selection transistors MT1, and K second time-length selection transistors MT2.

A control electrode of a $k^{th}$ first current selection transistor MI1 is electrically connected to the first current selection signal wire $DI\_MUX_1$, a first electrode of the $k^{th}$ first current selection transistor MI1 is electrically connected to a $(2k-1)^{th}$ column of the current data lines $DI_{2k-1}$, and a second electrode of the $k^{th}$ first current selection transistor MI1 is electrically connected to a $k^{th}$ column of current data output line $SI_k$, where $1 \le k \le N/2$. A control electrode of a first first current selection transistor MI1 is electrically connected to the first current selection signal wire $DI\_MUX_1$, a first electrode of the first first current selection transistor MI1 is electrically connected to a first column of the current data lines $DI_1$, a second electrode of the first first current selection transistor MI1 is electrically connected to a first column of current data output line $SI_1$, a control electrode of a second first current selection transistor MI1 is electrically connected to the first current selection signal wire $DI\_MUX_1$, a first electrode of the second first current selection transistor MI1 is electrically connected to a third column of the current data lines $DI_3$, a second electrode of the second first current selection transistor MI1 is electrically connected to a second column of current data output line $SI_2$, and so on.

A control electrode of a $k^{th}$ second current selection transistor MI2 is electrically connected to the second current selection signal wire $DI\_MUX_2$, a first electrode of the $k^{th}$ second current selection transistor MI2 is electrically connected to a $(2k)^{th}$ column of the current data lines $DI_{2k}$, and a second electrode of the $k^{th}$ second current selection transistor MI2 is electrically connected to the $k^{th}$ column of current data output line $SI_k$. A control electrode of a first second current selection transistor MI2 is electrically connected to the second current selection signal wire $DI\_MUX_2$, a first electrode of the first second current selection transistor MI2 is electrically connected to a second column of the current data lines $DI_2$, and a second electrode of the first second current selection transistor MI2 is electrically connected to the first column of current data output line $SI_1$. A control electrode of a second second current selection transistor MI2 is electrically connected to the second current selection signal wire $DI\_MUX_2$, a first electrode of the second second current selection transistor MI2 is electrically connected to a fourth column of the current data lines $DI_4$, and a second electrode of the second second current selection transistor MI2 is electrically connected to the second column of current data output line $SI_2$, and so on.

A control electrode of a $k^{th}$ first time-length selection transistor MT1 is electrically connected to the first time-length selection signal wire $DT\_MUX_1$, a first electrode of the $k^{th}$ first time-length selection transistor $MT_1$ is electrically connected to a $(2k-1)^{th}$ column of the time-length data lines $DT_{2k-1}$, and a second electrode of the $k^{th}$ first time-length selection transistor MT1 is electrically connected to a $k^{th}$ column of time-length data output line $ST_k$. A control electrode of a first first time-length selection transistor MT1 is electrically connected to the first time-length selection signal wire $DT\_MUX_1$, a first electrode of the first first time-length selection transistor $MT_1$ is electrically connected to a first column of the time-length data lines $DT_1$, and a second electrode of the first first time-length selection transistor MT1 is electrically connected to a first column of time-length data output line $ST_1$. A control electrode of a second first time-length selection transistor MT1 is electrically connected to the first time-length selection signal wire $DT\_MUX_1$, a first electrode of the second first time-length selection transistor MT1 is electrically connected to a third column of the time-length data lines $DT_3$, and a second electrode of the second first time-length selection transistor MT1 is electrically connected to a third column of time-length data output line $ST_3$, and so on.

A control electrode of a $k^{th}$ second time-length selection transistor MT2 is electrically connected to the second time-length selection signal wire $DT\_MUX_2$, a first electrode of the $k^{th}$ second time-length selection transistor MT2 is electrically connected to a $(2k)^{th}$ column of the time-length data lines $DT_{2k}$, and a second electrode of the $k^{th}$ second time-length selection transistor MT2 is electrically connected to the $k^{th}$ column of time-length data output line $ST_k$. A control electrode of a first second time-length selection transistor MT2 is electrically connected to the second time-length selection signal wire $DT\_MUX_2$, a first electrode of the first second time-length selection transistor MT2 is electrically connected to a second column of the time-length data lines $DT_2$, and a second electrode of the first second time-length selection transistor MT2 is electrically connected to the first column of time-length data output line $ST_1$. A control electrode of a second second time-length selection transistor MT2 is electrically connected to the second time-length selection signal wire $DT\_MUX_2$, a first electrode of the second second time-length selection transistor MT2 is electrically connected to a fourth column of the time-length data lines $DT_4$, and a second electrode of the second second time-length selection transistor MT2 is electrically connected to the second column of time-length data output line $ST_2$.

In an exemplary embodiment, a time-length data output line $ST_i$ provides a data signal to a $(2i-1)^{th}$ column of the time-length data lines $DT_{2i-1}$ and a $2i^{th}$ column of the time-length data lines $DT_{2i}$ in a time sharing manner. A current data output line $SI_i$ provides a data signal to a $(2i-1)^{th}$ column of the current data lines $DI_{2i-1}$ and a $2i^{th}$ column of the current data lines $DI_{2i}$ in a time-sharing manner.

In an exemplary embodiment, the first current selection transistor MI1, the second current selection transistor MI2, the first time-length selection transistor MT1, and the second time-length selection transistor MT2 may be switch transistors.

The first current selection transistor MI1, the second current selection transistor MI2, the first time-length selection transistor MT1, and the second time-length selection transistor MT2 may be all P-type transistors, or may be all N-type transistors.

Figure 16:
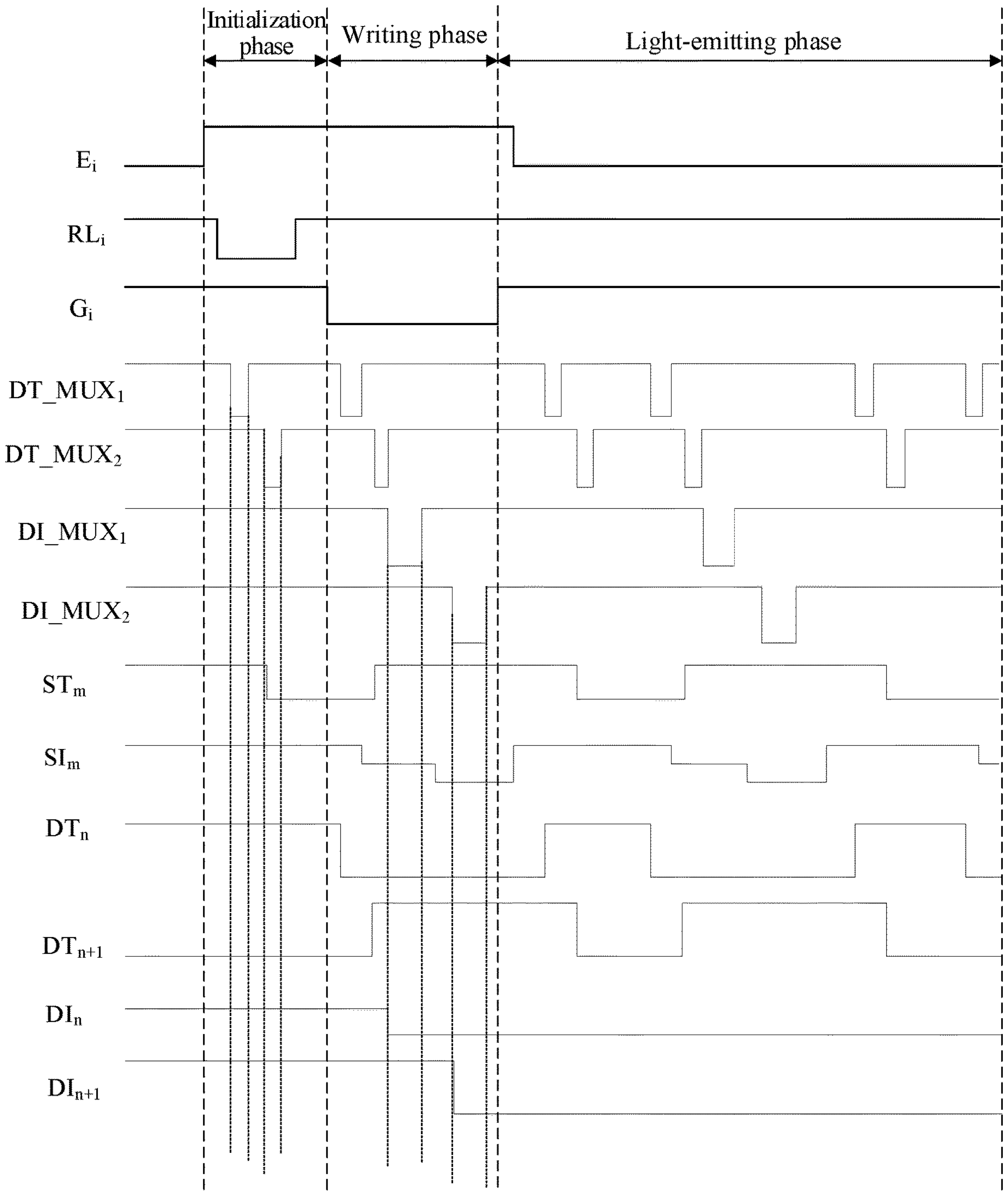
FIG. 16 is a sequence diagram of a display panel according to an exemplary embodiment.

Taking the first current selection transistor MI1, the second current selection transistor MI2, the first time length selection transistor MT1, and the second time length selection transistor MT2 as P-type transistors as an example, FIG. 16 is a sequence diagram of a display panel according to an exemplary embodiment. FIG. 16 shows a sequence diagram of pixel circuits in the same row and adjacent columns. As shown in FIG. 16, $DT_n$ is a time-length data line connected to the pixel circuit in the pixel unit in $i^{th}$ row and $n^{th}$ column, $DI_n$ is the current data line connected to the pixel unit in $i^{th}$ row and $n^{th}$ column, $ST_m$ is a time-length data output line connected to $DT_n$ and $DT_{n+1}$, and $SI_m$ is a current data output line connected to $DI_n$ and $DI_{n+1}$, where $m=(n+1)/2$, and n is an odd number.

For the pixel unit in $i^{th}$ row and $n^{th}$ column and the pixel unit in $i^{th}$ row and $(n+1)^{th}$ column, an example is taken that $DT_n$ is electrically connected to the first time-length selection signal wire $DT\_MUX_1$, $DT_{n+1}$ is electrically connected to the second time-length selection signal wire $DT\_MUX_2$, $DI_n$ is electrically connected to the first time-length selection signal wire $DI\_MUX_1$, $DI_{n+1}$ is electrically connected to the second time-length selection signal wire $DI\_MUX_2$, and $DI_n$ and $DT_{n+1}$ are located in the pixel unit in the $i^{th}$ row and $n^{th}$ column and the pixel unit in the $i^{th}$ row and $(n+1)^{th}$ column, as shown in FIG. 16, the pixel circuit in the pixel unit in the $i^{th}$ row and $n^{th}$ column and the pixel circuit in the $i^{th}$ row and $(n+1)^{th}$ column are connected to the same light-emitting signal wire $E_i$, reset signal wire $RL_i$ and scanning signal wire $G_i$. That is, the pixel circuit in the pixel unit in the $i^{th}$ row and $n^{th}$ column and the pixel circuit in the pixel unit in the $i^{th}$ row and $(n+1)^{th}$ column sequentially simultaneously undergo the initialization phase, the writing phase, and the light-emitting phase. When $DI_{n+1}$ is in a floating state during the writing phase (that is, a time period when $DI\_MUX_2$ is at an invalid level), no voltage fluctuations will be caused in the signal of the $DT_n$ or the $DT_{n+1}$, that is, the signal of the $DT_n$ or $DT_{n+1}$ has completed a change of the corresponding voltage signal, so that the signal of the $DI_{n+1}$ can be prevented from being disturbed by the level change of the signal of the $DT_{n+1}$, the poor column brightness contrast can be avoided, and the display effect of the display product is improved. Correspondingly, when $DI_n$ is in a floating state during the writing phase (that is, a time period when $DI\_MUX_1$ is at an invalid level), no voltage fluctuations will be caused in the signal of the $DT_{n-1}$ or $DT_n$, that is, the signal of the $DT_n$ or $DT_{n-1}$ has completed a change of the corresponding voltage signal, so that the signal of the $DI_n$ is prevented from being disturbed by the level change of the signal of the $DT_{n-1}$, the poor column brightness contrast can be avoided, and the display effect of the display product is improved.

An embodiment of the disclosure further provides a display device, including a display panel.

The display panel is the display panel according to any one of the foregoing embodiments, and the implementation principle and implementation effects are similar, which will not be repeated here.

In an exemplary embodiment, the display device may be any device that displays whether it is moving (for example, a video) or fixed (for example, a still image), and whether it is text or image. More specifically, the display device can be one of various electronic devices, can be implemented in or associated with various electronic devices. The various electronic devices include, for example, (but not limited to), a mobile phone, a wireless device, a personal data assistant, a handheld or portable computer, a GPS receiver/navigator, a camera, an MP4 video player, a camcorder, a game console, a watch, a clock, a calculator, a TV monitor, a flat panel display, a computer monitor, a car monitor (e.g., an odometer display), a navigator, a cockpit controller and/or display, a camera view display (e.g., a display of a rear-view camera in a car), an electronic photo, an electronic billboard or sign, a projector, building structure, a package, and an aesthetic structure (e.g., an image display for a piece of jewelry). The embodiment of the present disclosure does not limit the specific form of the above-mentioned display device.

An embodiment of the present disclosure further provides a control method for a display panel, used for controlling the display panel. The control method for the display panel according to the embodiment of the present disclosure includes the following operation.

A signal is provided to N current data lines and along N time-length data lines so that the time for two current data lines between two adjacent columns of pixel units, and/or two time-length data lines between two adjacent columns of pixel units, and/or a time-length data line and a current data line between two adjacent columns of pixel units to receive a valid level signal does not coincide.

The display panel is the display panel according to any one of the foregoing embodiments, and the implementation principle and implementation effects are similar, which will not be repeated here.

In an exemplary embodiment, the display panel includes: M rows and N columns of pixel units, M scanning signal wires sequentially arranged in a column direction, M reset signal wires sequentially arranged in the column direction, and M light-emitting signal wires sequentially arranged in the column direction; each pixel unit includes a pixel circuit, scanning signal terminals of the same row of pixel circuits are connected to the same scanning signal wire, light-emitting signal terminals of the same row of pixel circuits are connected to the same light-emitting signal wire, and reset signal terminals of the same row of pixel circuits are connected to the same reset signal wire; the pixel circuit includes: a node control sub-circuit, a writing sub-circuit, a drive sub-circuit, a light-emitting control sub-circuit, a first control sub-circuit, and a second control sub-circuit. The control method for a display panel according to an exemplary embodiment includes the following operations.

Under the control of the reset signal wire, a signal is provided to the reset signal terminal of each pixel circuit in the same row of pixel circuits, so that the node control sub-circuit of each pixel circuit in the same row of pixel circuits provides a signal of the initial signal terminal to a second node and a third node under the control of the reset signal terminal.

Under the control of the scanning signal wire, a signal is provided to the scanning signal terminal of each pixel circuit in the same row of pixel circuits, so that the writing sub-circuit of each pixel circuit in the same row of pixel circuits provides a signal of the current data terminal to a fifth node under the control of the scanning signal terminal, and the drive sub-circuit provides a drive current to a fourth node under the control of the third node and the fifth node.

Under the control of the light-emitting signal wire, a signal is provided to the light-emitting signal terminal of each pixel circuit in the same row of the pixel circuit, so that the light-emitting control sub-circuit of each pixel circuit in the same row of pixel circuits provides a signal of the first power terminal to the fifth node and provide a signal of the fourth node to the second node under the control of the first node and the light-emitting signal terminal.

In a case where a gray tone displayed by the pixel unit is greater than a threshold gray tone, the control method for a display panel according to an exemplary embodiment may further include: under the control of the scanning signal wire, a signal is provided to the scanning signal terminal of each pixel circuit in the same row of the pixel circuit, so that the first control sub-circuit of each pixel circuit in the same row of pixel circuits provides a signal of the light-emitting signal terminal to the first node under the control of the current data terminal, the scanning signal terminal, and the ground terminal.

In a case where a gray tone displayed by the pixel unit is less than a threshold gray tone, the control method for a display panel according to an exemplary embodiment may further include: under the control of the reset signal wire, providing a signal to the reset signal terminal of each pixel circuit in the same row of pixel circuits, so that the second control sub-circuit of each pixel circuit in the same row of pixel circuits provide a signal of the high-frequency input terminal to the first node under the control of the time-length data terminal, the reset signal terminal, and the ground terminal.

The accompanying drawings of the present disclosure only involve the structures involved in the embodiments of the present disclosure, and the other structures may refer to conventional designs.

Although the implementation modes of the present disclosure are disclosed above, the contents are only implementation modes adopted to easily understand the present disclosure and not intended to limit the present disclosure. Any of those skilled in the art of the disclosure can make any modifications and variations in the implementation manner and details without departing from the spirit and scope of the disclosure. However, the protection scope of the disclosure should be subject to the scope defined by the appended claims.

The invention claimed is:

1. A display panel, comprising: M rows and N columns of pixel units, N current data lines sequentially arranged in a row direction, and N time-length data lines sequentially arranged in the row direction; wherein each pixel unit comprises a pixel circuit, the pixel circuit comprising a current data terminal and a time-length data terminal;

an $i^{th}$ column of the current data lines and an $i^{th}$ column of the time-length data lines are respectively located on two sides of an $i^{th}$ column of pixel units, the current data terminals of the pixel circuits of the $i^{th}$ column of pixel units are electrically connected to the $i^{th}$ column of the current data lines, and the time-length data terminals of the pixel circuits of the $i^{th}$ column of pixel units are electrically connected to the $i^{th}$ column of the time-length data lines, wherein $1 \le i \le N$; and the time for two current data lines between two adjacent columns of pixel units, and/or two time-length data lines between two adjacent columns of pixel units, and/or a time-length data line and a current data line between two adjacent columns of pixel units to receive a valid level signal does not coincide;

wherein the display panel further comprises a first current selection signal wire, a second current selection signal wire, a first time-length selection signal wire, and a second time-length selection signal wire; wherein two adjacent columns of current data lines are respectively electrically connected to the first current selection signal wire and the second current selection signal wire, and two adjacent columns of time-length data lines are respectively electrically connected to the first time-length selection signal wire and the second time-length selection signal wire; and the time for the first current selection signal wire, the second current selection signal wire, the first time-length selection signal wire, and the second time-length selection signal wire to receive a valid level signal does not coincide.

2. The display panel according to claim 1, wherein the current data lines in odd columns are electrically connected to the first current selection signal wire, the time-length data lines in odd columns are electrically connected to the first time-length selection signal wire, the current data lines in even columns are electrically connected to the second current selection signal wire, and the time-length data lines in even columns are electrically connected to the second time-length selection signal wire; or the current data lines in even columns are electrically connected to the first current selection signal wire, the time-length data lines in even columns are electrically connected to the first time-length selection signal wire, the current data lines in odd columns are electrically connected to the second current selection signal wire, and the time-length data lines in odd columns are electrically connected to the second time-length selection signal wire.

3. The display panel according to claim 1, further comprising M scanning signal wires sequentially arranged in a column direction, M reset signal wires sequentially arranged in the column direction, and M light-emitting signal wires sequentially arranged in the column direction; wherein the pixel circuit further comprises: a scanning signal terminal, a reset signal terminal, and a light-emitting signal terminal; and for each pixel circuit in an $m^{th}$ row of pixel units, the scanning signal terminal of the pixel circuit is electrically connected to an $m^{th}$ row of scanning signal wire, the reset signal terminal of the pixel circuit is electrically connected to an $m^{th}$ row of reset signal wire, and the light-emitting signal terminal of the pixel circuit is electrically connected to an $m^{th}$ row of light-emitting signal wire, wherein $1 \le m \le M$.

4. The display panel according to claim 1, wherein each pixel unit further comprises: a light-emitting element, the pixel circuit and the light-emitting element in the same pixel unit are electrically connected, and the pixel circuit comprises: a current control sub-circuit and a time-length control sub-circuit;

the current control sub-circuit is electrically connected to a current data terminal, a scanning signal terminal, a reset signal terminal, an initial signal terminal, a light-emitting signal terminal, a first power terminal, a first node, and a second node, respectively, and is arranged to provide a drive current to the second node under the control of the current data terminal, the scanning signal terminal, the reset signal terminal, the initial signal terminal, the light-emitting signal terminal, the first power terminal, and the first node;

the time-length control sub-circuit is electrically connected to a scanning signal terminal, a time-length data terminal, a ground terminal, a reset signal terminal, a light-emitting signal terminal, a high-frequency input terminal and the first node, respectively, and is arranged to provide a signal of the light-emitting signal terminal or a signal of the high-frequency input terminal to the first node under the control of the scanning signal terminal, the time-length data terminal, the ground terminal, the light-emitting signal terminal, the reset signal terminal, and the high-frequency input terminal; and the light-emitting element is electrically connected to the second node and a second power terminal, respectively.

5. The display panel according to claim 4, wherein the current control sub-circuit comprises: a node control sub-circuit, a writing sub-circuit, a drive sub-circuit, and a light-emitting control sub-circuit;

the node control sub-circuit is electrically connected to the scanning signal terminal, the reset signal terminal, the initial signal terminal, the second node, a third node, a fourth node, and the first power terminal, respectively, and is arranged to provide a signal of the initial signal terminal to the second node and the third node and provide a signal of the third node to the fourth node under the control of the reset signal terminal and the scanning signal terminal;

the writing sub-circuit is electrically connected to the scanning signal terminal, the current data terminal, and a fifth node, respectively, and is arranged to provide a signal of the current data terminal to the fifth node under the control of the scanning signal terminal;

the drive sub-circuit is electrically connected to the third node, the fourth node, and the fifth node, respectively, and is arranged to provide the drive current to the fourth node, under the control of the third node and the fifth node; and the light-emitting control sub-circuit is electrically connected to the light-emitting signal terminal, the first node, the second node, the fourth node, the fifth node, and the first power terminal, respectively, and is arranged to provide a signal of the first power terminal to the fifth node and provide a signal of the fourth node to the second node, under the control of the first node and the light-emitting signal terminal.

6. The display panel according to claim 5, wherein the node control sub-circuit comprises: a first transistor, a second transistor, a third transistor, and a first capacitor, the writing sub-circuit comprises: a fourth transistor, the drive sub-circuit comprises: a fifth transistor, and the light-emitting control sub-circuit comprises: a sixth transistor, a seventh transistor, and an eighth transistor;

a control electrode of the first transistor is electrically connected to the reset signal terminal, a first electrode of the first transistor is electrically connected to the initial signal terminal, and a second electrode of the first transistor is electrically connected to the third node;

a control electrode of the second transistor is electrically connected to the reset signal terminal, a first electrode of the second transistor is electrically connected to the initial signal terminal, and a second electrode of the second transistor is electrically connected to the second node;

a control electrode of the third transistor is electrically connected to the scanning signal terminal, a first electrode of the third transistor is electrically connected to the third node, and a second electrode of the third transistor is electrically connected to the fourth node;

a first terminal of the first capacitor is electrically connected to the third node, and a second terminal of the first capacitor is electrically connected to the first power terminal;

a control electrode of the fourth transistor is electrically connected to the scanning signal terminal, a first electrode of the fourth transistor is electrically connected to the fifth node, and a second electrode of the fourth transistor is electrically connected to the current data terminal;

a control terminal of the fifth transistor is electrically connected to the third node, a first electrode of the fifth transistor is electrically connected to the fifth node, and a second electrode of the fifth transistor is electrically connected to the fourth node;

a control terminal of the sixth transistor is electrically connected to the light-emitting signal terminal, a first electrode of the sixth transistor is electrically connected to the first power terminal, and a second electrode of the sixth transistor is electrically connected to the fifth node;

a control electrode of the seventh transistor is electrically connected to the light-emitting signal terminal, a first electrode of the seventh transistor is electrically connected to the fourth node, and a second electrode of the seventh transistor is electrically connected to a first electrode of the eighth transistor;

a control electrode of the eighth transistor is electrically connected to the first node, and a second electrode of the eighth transistor is electrically connected to the second node; and the first transistor, the second transistor, the third transistor, the fourth transistor, the sixth transistor, the seventh transistor, and the eighth transistor are switch transistors, and the fifth transistor is a drive transistor.

7. The display panel according to claim 5, wherein the node control sub-circuit comprises: a first transistor, a second transistor, a third transistor, and a first capacitor, the writing sub-circuit comprises: a fourth transistor, the drive sub-circuit comprises: a fifth transistor, and the light-emitting control sub-circuit comprises: a sixth transistor and an eighth transistor;

a control electrode of the first transistor is electrically connected to the reset signal terminal, a first electrode of the first transistor is electrically connected to the initial signal terminal, and a second electrode of the first transistor is electrically connected to the third node;

a control electrode of the second transistor is electrically connected to the reset signal terminal, a first electrode of the second transistor is electrically connected to the initial signal terminal, and a second electrode of the second transistor is electrically connected to the second node;

a control electrode of the third transistor is electrically connected to the scanning signal terminal, a first electrode of the third transistor is electrically connected to the third node, and a second electrode of the third transistor is electrically connected to the fourth node;

a first terminal of the first capacitor is electrically connected to the third node, and a second terminal of the first capacitor is electrically connected to the first power terminal;

a control electrode of the fourth transistor is electrically connected to the scanning signal terminal, a first electrode of the fourth transistor is electrically connected to the fifth node, and a second electrode of the fourth transistor is electrically connected to the current data terminal;

a control terminal of the fifth transistor is electrically connected to the third node, a first electrode of the fifth transistor is electrically connected to the fifth node, and a second electrode of the fifth transistor is electrically connected to the fourth node;

a control terminal of the sixth transistor is electrically connected to the light-emitting signal terminal, a first electrode of the sixth transistor is electrically connected to the first power terminal, and a second electrode of the sixth transistor is electrically connected to the fifth node;

a control electrode of the eighth transistor is electrically connected to the first node, a first electrode of the eighth transistor is electrically connected to the fourth node, and a second electrode of the eighth transistor is electrically connected to the second node; and the first transistor, the second transistor, the third transistor, the fourth transistor, the sixth transistor, and the eighth transistor are switch transistors, and the fifth transistor is a drive transistor.

8. The display panel according to claim 4, wherein the time-length control sub-circuit comprises: a first control sub-circuit and a second control sub-circuit;

the first control sub-circuit is electrically connected to the time-length data terminal, the scanning signal terminal, the ground terminal, the light-emitting signal terminal, and the first node, respectively, and is arranged to provide the signal of the light-emitting signal terminal to the first node under the control of the current data terminal, the scanning signal terminal, and the ground terminal; and the second control sub-circuit is electrically connected to the time-length data terminal, the reset signal terminal, the ground terminal, the high-frequency input terminal, and the first node, respectively, and is arranged to provide the signal of the high-frequency input terminal to the first node under the control of the time-length data terminal, the reset signal terminal, and the ground terminal.

9. The display panel according to claim 8, wherein the first control sub-circuit comprises: a ninth transistor, a tenth transistor, and a second capacitor; and the second control sub-circuit comprises: an eleventh transistor, a twelfth transistor, and a third capacitor;

a control electrode of the ninth transistor is electrically connected to a sixth node, a first electrode of the ninth transistor is electrically connected to the light-emitting signal terminal, and a second electrode of the ninth transistor is electrically connected to the first node;

a control electrode of the tenth transistor is electrically connected to the scanning signal terminal, a first electrode of the tenth transistor is electrically connected to the time-length data terminal, and a second electrode of the tenth transistor is electrically connected to the sixth node;

a first terminal of the second capacitor is electrically connected to the sixth node, and a second terminal of the second capacitor is electrically connected to the ground terminal;

a control electrode of the eleventh transistor is electrically connected to a seventh node, a first electrode of the eleventh transistor is electrically connected to the high-frequency input terminal, and a second electrode of the eleventh transistor is electrically connected to the first node;

a control electrode of the twelfth transistor is electrically connected to the reset signal terminal, a first electrode of the twelfth transistor is electrically connected to the time-length data terminal, and a second electrode of the twelfth transistor is electrically connected to the seventh node;

a first terminal of the third capacitor is electrically connected to the seventh node, and a second terminal of the third capacitor is electrically connected to the ground terminal; and the ninth transistor, the tenth transistor, the eleventh transistor, and the twelfth transistor are switch transistors.

10. The display panel according to claim 4, wherein the light-emitting element is a micro-light-emitting diode, an anode of the light-emitting element is electrically connected to the second node, and a cathode of the light-emitting element is electrically connected to the second power terminal.

11. The display panel according to claim 4, wherein the current control sub-circuit comprises: a first transistor, a second transistor, a third transistor, a first capacitor, a fourth transistor, a fifth transistor, a sixth transistor, a seventh transistor and an eighth transistor; and the time-length control sub-circuit comprises: a ninth transistor, a tenth transistor, a second capacitor, an eleventh transistor, a twelfth transistor, and a third capacitor;

a control electrode of the first transistor is electrically connected to the reset signal terminal, a first electrode of the first transistor is electrically connected to the initial signal terminal, and a second electrode of the first transistor is electrically connected to the third node;

a control electrode of the second transistor is electrically connected to the reset signal terminal, a first electrode of the second transistor is electrically connected to the initial signal terminal, and a second electrode of the second transistor is electrically connected to the second node;

a control electrode of the third transistor is electrically connected to the scanning signal terminal, a first electrode of the third transistor is electrically connected to the third node, and a second electrode of the third transistor is electrically connected to the fourth node;

a first terminal of the first capacitor is electrically connected to the third node, and a second terminal of the first capacitor is electrically connected to the first power terminal;

a control electrode of the fourth transistor is electrically connected to the scanning signal terminal, a first electrode of the fourth transistor is electrically connected to the fifth node, and a second electrode of the fourth transistor is electrically connected to the current data terminal;

a control terminal of the fifth transistor is electrically connected to the third node, a first electrode of the fifth transistor is electrically connected to the fifth node, and a second electrode of the fifth transistor is electrically connected to the fourth node;

a control terminal of the sixth transistor is electrically connected to the light-emitting signal terminal, a first electrode of the sixth transistor is electrically connected to the first power terminal, and a second electrode of the sixth transistor is electrically connected to the fifth node;

a control electrode of the seventh transistor is electrically connected to the light-emitting signal terminal, a first electrode of the seventh transistor is electrically connected to the fourth node, and a second electrode of the seventh transistor is electrically connected to a first electrode of the eighth transistor;

a control electrode of the eighth transistor is electrically connected to the first node, and a second electrode of the eighth transistor is electrically connected to the second node; and a control electrode of the ninth transistor is electrically connected to a sixth node, a first electrode of the ninth transistor is electrically connected to the light-emitting signal terminal, and a second electrode of the ninth transistor is electrically connected to the first node;

a control electrode of the tenth transistor is electrically connected to the scanning signal terminal, a first electrode of the tenth transistor is electrically connected to the time-length data terminal, and a second electrode of the tenth transistor is electrically connected to the sixth node;

a first terminal of the second capacitor is electrically connected to the sixth node, and a second terminal of the second capacitor is electrically connected to the ground terminal;

a control electrode of the eleventh transistor is electrically connected to a seventh node, a first electrode of the eleventh transistor is electrically connected to the high-frequency input terminal, and a second electrode of the eleventh transistor is electrically connected to the first node;

a control electrode of the twelfth transistor is electrically connected to the reset signal terminal, a first electrode of the twelfth transistor is electrically connected to the time-length data terminal, and a second electrode of the twelfth transistor is electrically connected to the seventh node; and a first terminal of the third capacitor is electrically connected to the seventh node, and a second terminal of the third capacitor is electrically connected to the ground terminal.

12. The display panel according to claim 11, wherein in a case where a gray tone displayed by the pixel unit is greater than a threshold gray tone, when a level of a signal of the reset signal terminal is a valid level signal, a level of a signal of the time-length data terminal is a first invalid level, and when a level of a signal of the scanning signal terminal is a valid level signal, the level of the signal of the time-length data terminal is a first valid level;

in a case where a gray tone displayed by the pixel unit is less than a threshold gray tone, when a level of a signal of the reset signal terminal is a valid level signal, a level of a signal of the time-length data terminal is a second valid level, and when a level of a signal of the scanning signal terminal is a valid level signal, the level of the signal of the time-length data terminal is a second invalid level;

wherein the first invalid level is a level making the twelfth transistor off, the first valid level is a level making the ninth transistor on, the second valid level is a level making the twelfth transistor on, and the second invalid level is a level making the ninth transistor off.

13. The display panel according to claim 4, wherein the current control sub-circuit comprises: a first transistor, a second transistor, a third transistor, a first capacitor, a fourth transistor, a fifth transistor, a sixth transistor, and an eighth transistor; and the time-length control sub-circuit comprises: a ninth transistor, a tenth transistor, a second capacitor, an eleventh transistor, a twelfth transistor, and a third capacitor;

a control electrode of the first transistor is electrically connected to the reset signal terminal, a first electrode of the first transistor is electrically connected to the initial signal terminal, and a second electrode of the first transistor is electrically connected to the third node;

a control electrode of the second transistor is electrically connected to the reset signal terminal, a first electrode of the second transistor is electrically connected to the initial signal terminal, and a second electrode of the second transistor is electrically connected to the second node;

a control electrode of the third transistor is electrically connected to the scanning signal terminal, a first electrode of the third transistor is electrically connected to the third node, and a second electrode of the third transistor is electrically connected to the fourth node;

a first terminal of the first capacitor is electrically connected to the third node, and a second terminal of the first capacitor is electrically connected to the first power terminal;

a control electrode of the fourth transistor is electrically connected to the scanning signal terminal, a first electrode of the fourth transistor is electrically connected to the fifth node, and a second electrode of the fourth transistor is electrically connected to the current data terminal;

a control terminal of the fifth transistor is electrically connected to the third node, a first electrode of the fifth transistor is electrically connected to the fifth node, and a second electrode of the fifth transistor is electrically connected to the fourth node;

a control terminal of the sixth transistor is electrically connected to the light-emitting signal terminal, a first electrode of the sixth transistor is electrically connected to the first power terminal, and a second electrode of the sixth transistor is electrically connected to the fifth node;

a control electrode of the eighth transistor is electrically connected to the first node, a first electrode of the eighth transistor is electrically connected to the fourth node, and a second electrode of the eighth transistor is electrically connected to the second node; and a control electrode of the ninth transistor is electrically connected to a sixth node, a first electrode of the ninth transistor is electrically connected to the light-emitting signal terminal, and a second electrode of the ninth transistor is electrically connected to the first node;

a control electrode of the tenth transistor is electrically connected to the scanning signal terminal, a first electrode of the tenth transistor is electrically connected to the time-length data terminal, and a second electrode of the tenth transistor is electrically connected to the sixth node;

a first terminal of the second capacitor is electrically connected to the sixth node, and a second terminal of the second capacitor is electrically connected to the ground terminal;

a control electrode of the eleventh transistor is electrically connected to a seventh node, a first electrode of the eleventh transistor is electrically connected to the high-frequency input terminal, and a second electrode of the eleventh transistor is electrically connected to the first node;

a control electrode of the twelfth transistor is electrically connected to the reset signal terminal, a first electrode of the twelfth transistor is electrically connected to the time-length data terminal, and a second electrode of the twelfth transistor is electrically connected to the seventh node; and a first terminal of the third capacitor is electrically connected to the seventh node, and a second terminal of the third capacitor is electrically connected to the ground terminal.

14. The display panel according to claim 1, further comprising a multiplexed output selection circuit, K current data output lines sequentially arranged in a column direction, and K time-length data output lines sequentially arranged in the column direction, wherein K=N/2;

the multiplexed output selection circuit is electrically connected to N current data lines, N time-length data lines, K current data output lines, K time-length data output lines, a first current selection signal wire, a second current selection signal wire, a first time-length selection signal wire, and a second time-length selection signal wire, respectively, and is arranged to output data signals of the K current data lines to the N current data lines in a time-sharing manner and output data signals of the K time-length data output lines to the N time-length data lines in a time-sharing manner under the control of the first current selection signal wire, the second current selection signal wire, the first time-length selection signal wire, and the second time-length selection signal wire.

15. The display panel according to claim 14, wherein the multiplexed output selection circuit comprises: K first current selection transistors, K second current selection transistors, K first time-length selection transistors, and K second time-length selection transistors;

a control electrode of a $k^{th}$ first current selection transistor is electrically connected to the first current selection signal wire, a first electrode of the $k^{th}$ first current selection transistor is electrically connected to a $(2k-1)^{th}$ column of the current data lines, and a second electrode of the $k^{th}$ first current selection transistor is electrically connected to a $k^{th}$ column of current data output line, wherein $1 \le k \le K$;

a control electrode of a $k^{th}$ second current selection transistor is electrically connected to the second current selection signal wire, a first electrode of the $k^{th}$ second current selection transistor is electrically connected to a $(2k)^{th}$ column of the current data lines, and a second electrode of the $k^{th}$ second current selection transistor is electrically connected to the k column of current data output line;

a control electrode of a $k^{th}$ first time-length selection transistor is electrically connected to the first time-length selection signal wire, a first electrode of the $k^{th}$ first time-length selection transistor is electrically connected to a $(2k-1)^{th}$ column of the time-length data lines, and a second electrode of the $k^{th}$ first time-length selection transistor is electrically connected to a $k^{th}$ column of time-length data output line;

a control electrode of a $k^{th}$ second time-length selection transistor is electrically connected to the second time-length selection signal wire, a first electrode of the $k^{th}$ second time-length selection transistor is electrically connected to a $(2k)^{th}$ column of the time-length data lines, and a second electrode of the $k^{th}$ first time-length selection transistor is electrically connected to the $k^{th}$ column of time-length data output line; and the first current selection transistor, the second current selection transistor, the first time-length selection transistor, and the second time-length selection transistor are switch transistors.

16. The display panel according to claim 1, wherein a duration of the valid level signal of the first current selection signal wire is equal to a duration of the valid level signal of the second current selection signal wire, a duration of the valid level signal of the first time-length selection signal wire is equal to a duration of the valid level signal of the second time-length selection signal wire, and the duration of the valid level signal of the first current selection signal wire is greater than the duration of the valid level signal of the first time-length selection signal wire.

17. A display device, comprising the display panel according to claim 1.

18. A control method for a display panel, used for controlling the display panel according to claim 1, the method comprising:

providing a signal to N current data lines and along N time-length data lines so that the time for two current data lines between two adjacent columns of pixel units, and/or two time-length data lines between two adjacent columns of pixel units, and/or a time-length data line and a current data line between two adjacent columns of pixel units to receive a valid level signal does not coincide.

19. The method according to claim 18, wherein the display panel comprises: M rows and N columns of pixel units, M scanning signal wires sequentially arranged in a column direction, M reset signal wires sequentially arranged in the column direction, and M light-emitting signal wires sequentially arranged in the column direction; each pixel unit comprises a pixel circuit, wherein scanning signal terminals of the same row of pixel circuits are connected to the same scanning signal wire, light-emitting signal terminals of the same row of pixel circuits are connected to the same light-emitting signal wire, and reset signal terminals of the same row of pixel circuits are connected to the same reset signal wire; the pixel circuit comprises: a current control sub-circuit and a time-length control sub-circuit;

wherein the current control sub-circuit comprises a node control sub-circuit, a writing sub-circuit, a drive sub-circuit, and light-emitting control sub-circuit, wherein the node control sub-circuit is electrically connected to a scanning signal terminal, a reset signal terminal, an initial signal terminal, a second node, a third node, a fourth node, and a first power terminal, respectively; the writing sub-circuit is electrically connected to the scanning signal terminal, the current data terminal, and a fifth node, respectively; the drive sub-circuit is electrically connected to the third node, the fourth node, and the fifth node, respectively; and the light-emitting control sub-circuit is electrically connected to a light-emitting signal terminal, a first node, the second node, the fourth node, the fifth node, and the first power terminal, respectively;

wherein the time-length control sub-circuit comprises a first control sub-circuit, and a second control sub-circuit; wherein the first control sub-circuit is electrically connected to the time-length data terminal, the scanning signal terminal, a ground terminal, the light-emitting signal terminal, and the first node, respectively; and the second control sub-circuit is electrically connected to the time-length data terminal, the reset signal terminal, the ground terminal, a high-frequency input terminal, and the first node, respectively;

under the control of the reset signal wire, providing a signal to the reset signal terminal of each pixel circuit in the same row of pixel circuits, so that the node control sub-circuit of each pixel circuit in the same row of pixel circuits provides a signal of the initial signal terminal to a second node and a third node under the control of the reset signal terminal;

under the control of the scanning signal wire, providing a signal to the scanning signal terminal of each pixel circuit in the same row of pixel circuits, so that the writing sub-circuit of each pixel circuit in the same row of pixel circuits provides a signal of the current data terminal to a fifth node under the control of the scanning signal terminal, and the drive sub-circuit provides a drive current to a fourth node under the control of the third node and the fifth node;

under the control of the light-emitting signal wire, providing a signal to the light-emitting signal terminal of each pixel circuit in the same row of pixel circuits, so that the light-emitting control sub-circuit of each pixel circuit in the same row of pixel circuits provides a signal of the first power terminal to the fifth node and provides a signal of the fourth node to the second node under the control of the first node and the light-emitting signal terminal;

in a case where a gray tone displayed by the pixel unit is greater than a threshold gray tone, the method further comprising: under the control of the scanning signal wire, providing a signal to the scanning signal terminal of each pixel circuit in the same row of pixel circuits, so that the first control sub-circuit of each pixel circuit in the same row of pixel circuits provides a signal of the light-emitting signal terminal to the first node under the control of the current data terminal, the scanning signal terminal, and the ground terminal; and in a case where a gray tone displayed by the pixel unit is less than a threshold gray tone, the method further comprising: under the control of the reset signal wire, providing a signal to the reset signal terminal of each pixel circuit in the same row of pixel circuits, so that the second control sub-circuit of each pixel circuit in the same row of pixel circuits provide a signal of the high-frequency input terminal to the first node under the control of the time-length data terminal, the reset signal terminal, and the ground terminal.

* * * * *